(12) United States Patent
Wu et al.

(10) Patent No.: US 12,099,471 B2
(45) Date of Patent: Sep. 24, 2024

(54) APPLICATION PROGRAM APP MANAGEMENT METHOD, TERMINAL DEVICE, SERVER, AND SYSTEM

(71) Applicant: Huawei Technologies Co., Ltd., Guangdong (CN)

(72) Inventors: Bin Wu, Shenzhen (CN); Xiuqiang He, Shenzhen (CN); Li Qian, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/145,635

(22) Filed: Dec. 22, 2022

(65) Prior Publication Data

US 2023/0129455 A1  Apr. 27, 2023

Related U.S. Application Data

(63) Continuation of application No. PCT/CN2021/101903, filed on Jun. 23, 2021.

(30) Foreign Application Priority Data

Jun. 28, 2020  (CN) .......................... 202010600137.6

(51) Int. Cl.
  G06F 16/16  (2019.01)
  G06F 18/22  (2023.01)
  G06F 18/23  (2023.01)

(52) U.S. Cl.
  CPC ............ *G06F 16/168* (2019.01); *G06F 18/22* (2023.01); *G06F 18/23* (2023.01)

(58) Field of Classification Search
  CPC ........ G06F 16/168; G06F 18/22; G06F 18/23; G06F 3/0482; G06F 3/04842; G06F 9/451
  See application file for complete search history.

(56) References Cited

U.S. PATENT DOCUMENTS 8,473,532 B1 * 6/2013 Ben .......................... G06F 16/13
  707/831
8,745,617 B1 * 6/2014 Stekkelpak ......... G06F 9/44505
  717/173

(Continued)

FOREIGN PATENT DOCUMENTS

CN  102455930 A  5/2012
CN  103049515 A  4/2013
(Continued)

OTHER PUBLICATIONS

Does App Library automatically organizes apps into folders?, retrieved from—https://forums.macrumors.com/threads/does-app-library-automatically-organizes-apps-into-folders.2242618/, Jun. 23, 2020, 11 pages (Year: 2020).*

(Continued)

*Primary Examiner* — Yongjia Pan
(74) *Attorney, Agent, or Firm* — WOMBLE BOND DICKINSON (US) LLP

(57) ABSTRACT

This application provides an application program (APP) management method, a terminal device, a server, and a system. According to the method, APPs downloaded on a terminal device can be automatically clustered. This saves time of a user and improves user experience. The method is applicable to a terminal device, and the method includes: obtaining a target desktop folder based on type information of an APP downloaded by the terminal device and attribute information of a desktop folder on the terminal device, where the downloaded APP is to be clustered in the target desktop folder; and clustering the downloaded APP into the target desktop folder.

29 Claims, 6 Drawing Sheets

200

S210: A terminal device obtains, according to type information of an APP downloaded by the terminal device and attribute information of a desktop folder on the terminal device, a target desktop folder in which the downloaded APP is to be clustered S220: The terminal device clusters the downloaded APP into the target desktop folder

(56) References Cited

U.S. PATENT DOCUMENTS

| | | | |
|---|---|---|---|
| 11,347,685 B2* | 5/2022 | Zeng | G06F 16/13 |
| 11,809,374 B1* | 11/2023 | Meyer | G06F 16/358 |
| 2009/0119269 A1* | 5/2009 | Im | G06F 9/445 |
| 2013/0166527 A1* | 6/2013 | Kasterstein | G06F 16/16 707/706 |
| 2013/0167090 A1 | 6/2013 | Tomizu | |
| 2013/0219319 A1* | 8/2013 | Park | G06F 3/0488 715/775 |
| 2013/0332886 A1* | 12/2013 | Cranfill | G06F 3/0482 715/835 |
| 2014/0282493 A1 | 9/2014 | Glover et al. | |
| 2015/0205459 A1* | 7/2015 | Kim | G06F 3/04817 715/765 |
| 2015/0355816 A1* | 12/2015 | Shim | H04L 67/02 715/745 |
| 2017/0123778 A1* | 5/2017 | Jones-Mcfadden | G06F 8/61 |
| 2017/0277526 A1* | 9/2017 | Shi | H04L 67/04 |
| 2021/0286510 A1* | 9/2021 | Tyler | G06F 3/0484 |
| 2022/0050810 A1* | 2/2022 | Rautray | G06F 16/148 |

FOREIGN PATENT DOCUMENTS

| | | | | |
|---|---|---|---|---|
| CN | 103309559 A | * | 9/2013 | |
| CN | 103473355 A | | 12/2013 | |
| CN | 103995845 A | | 8/2014 | |
| CN | 104063250 A | | 9/2014 | |
| CN | 104111927 A | | 10/2014 | |
| CN | 104536760 A | | 4/2015 | |
| CN | 104778178 A | | 7/2015 | |
| CN | 104850301 A | | 8/2015 | |
| CN | 105183295 A | | 12/2015 | |
| CN | 105446754 A | | 3/2016 | |
| CN | 105528138 A | * | 4/2016 | |
| CN | 105573604 A | | 5/2016 | |
| CN | 105868226 A | | 8/2016 | |
| CN | 105991722 A | | 10/2016 | |
| CN | 106156346 A | * | 11/2016 | G06F 17/30 |
| CN | 106202427 A | | 12/2016 | |
| CN | 106227400 A | * | 12/2016 | G06F 9/44 |
| CN | 106445934 A | | 2/2017 | |
| CN | 106503025 A | | 3/2017 | |
| CN | 106547427 A | | 3/2017 | |
| CN | 106598649 A | | 4/2017 | |
| CN | 106648304 A | | 5/2017 | |
| CN | 106681716 A | | 5/2017 | |
| CN | 106951571 A | | 7/2017 | |
| CN | 107018189 A | | 8/2017 | |
| CN | 107301209 A | | 10/2017 | |
| CN | 107451244 A | | 12/2017 | |
| CN | 107493339 A | | 12/2017 | |
| CN | 107608582 A | | 1/2018 | |
| CN | 107943960 A | | 4/2018 | |
| CN | 108958584 A | | 12/2018 | |
| CN | 109344127 A | | 2/2019 | |
| CN | 109361819 A | | 2/2019 | |
| CN | 109597628 A | | 4/2019 | |
| CN | 110598070 A | | 12/2019 | |
| CN | 110647448 A | | 1/2020 | |
| CN | 106909667 B | * | 10/2020 | G06F 16/951 |
| CN | 111880872 A | | 11/2020 | |
| FR | 3028630 A1 | * | 5/2016 | G06F 3/04817 |
| IN | 201811035921 A | | 3/2020 | |
| JP | 2021502631 A | * | 1/2021 | G06F 13/00 |
| JP | 2021144685 A | * | 9/2021 | G06F 3/0481 |
| WO | WO-2016106675 A1 | * | 7/2016 | G06F 3/0481 |

OTHER PUBLICATIONS

[Android 2.1+] LiveSorter—automatic applications sorter, retrieved from—https://forum.xda-developers.com/t/android-2-1-livesorter-automatic-applications-sorter. 1242120/, Aug. 30, 2011, 5 pages (Year: 2011).*

* cited by examiner

APPLICATION PROGRAM APP MANAGEMENT METHOD, TERMINAL DEVICE, SERVER, AND SYSTEM

CROSS-REFERENCE TO RELATED APPLICATIONS

This application is a continuation of International Application No. PCT/CN2021/101903, filed on Jun. 23, 2021, which claims priority to Chinese Patent Application No. 202010600137.6, filed on Jun. 28, 2020. The disclosures of the aforementioned applications are hereby incorporated by reference in their entireties.

TECHNICAL FIELD

This application relates to the terminal field, and more specifically, to an application program (application or APP) management method, a terminal device, a server, and a system.

BACKGROUND

With development of Internet technologies, more APPs are downloaded on a terminal device. For example, most users have at least dozens of APPs on mobile phones, and some users even have hundreds of APPs on mobile phones. Too many APPs clutter a screen of the terminal device, and it is hard to find and access wanted APPs through pages. This compromises the look and feel of the terminal device. Clustering a plurality of APPs in a desktop folder can reduce clutter and pages from the screen of the terminal device and users can easily access the APPs. In a conventional technology, the users usually manually cluster APPs into one folder, and this is inefficient.

Therefore, how to automatically cluster and manage APPs on a terminal device when an APP is downloaded is an urgent problem to be resolved.

SUMMARY

This application provides an application program APP management method, a terminal device, a server, and a system. According to the method, APPs downloaded on a terminal device can be automatically clustered. This saves time of a user and improves user experience.

According to a first aspect, an application program APP management method is provided. The method is applicable to a terminal device, and the method includes: obtaining, according to type information of an APP downloaded by the terminal device and attribute information of a desktop folder on the terminal device, a target desktop folder in which the downloaded APP is to be clustered; and clustering the downloaded APP into the target desktop folder.

Therefore, the terminal device obtains, according to the type information of the APP downloaded by the terminal device and the attribute information of the desktop folder on the terminal device, the target desktop folder in which the downloaded APP is to be clustered; and clusters the downloaded APP into the target desktop folder. The APP downloaded on the terminal device can be automatically clustered, and the APP is automatically placed in a correct desktop folder, without a manual user operation.

In an embodiment, the target desktop folder in which the downloaded APP is to be clustered may be obtained, according to the type information of the APP downloaded by the terminal device and the attribute information of the desktop folder on the terminal device, in an APP market APP and other software through which an application program can be downloaded; and the downloaded APP is clustered into the target desktop folder.

The terminal device obtains, according to the type information of the APP downloaded by the terminal device and the attribute information of the desktop folder on the terminal device, the target desktop folder in which the downloaded APP is to be clustered in the APP market APP installed on the terminal device; and clusters the downloaded APP into the target desktop folder. According to the method, the APP downloaded on the terminal device is automatically clustered in the APP market APP. In addition, because the APP market is requisite software of a mobile phone, a user does not need to install other software. Existing APPs can be automatically clustered and placed in correct desktop folders in a convenient and efficient manner without interfering with an original mobile phone system. In addition, each time an APP is downloaded, the APP is automatically clustered, without a manual user operation.

In an embodiment, the attribute information of the desktop folder includes a name of the desktop folder or type information of an APP in the desktop folder.

In an embodiment, that the target desktop folder in which the downloaded APP is to be clustered is obtained in the APP market APP according to the type of the APP downloaded by the terminal device and the attribute information of the desktop folder on the terminal device includes: determining a similarity between the type information of the downloaded APP and a name of a first desktop folder according to a similarity algorithm, where the first desktop folder is any desktop folder on the terminal device; and determining the first desktop folder as the target desktop folder when the similarity is greater than or equal to a first threshold or the similarity is the highest.

It should be further understood that the terminal device may determine, according to the similarity algorithm, whether category information of the APP is similar to a name of an existing desktop folder of the user, and then place, according to the first threshold, the APP into a most similar desktop folder that meets the threshold. The similarity algorithm includes but is not limited to: calculating a cosine similarity between a semantic vector of a name and a semantic vector of a desktop folder name (the semantic vector is obtained through modeling based on search data of an APP market); determining a hierarchical relationship of categories by using a knowledge graph, and determining whether the name and the folder name have a hierarchical relationship (for example, a game is superordinate to a gun game); and identifying, according to a data mining algorithm, whether the name and the folder name have a same meaning or are synonyms.

In an embodiment, that the target desktop folder in which the downloaded APP is to be clustered is obtained in the APP market APP according to the type of the APP downloaded by the terminal device and the attribute information of the desktop folder on the terminal device includes: determining a similarity between the type information of the downloaded APP and type information of a first APP according to a similarity algorithm, where the first APP is an APP in a second desktop folder on the terminal device; and determining the second desktop folder as the target desktop folder when the similarity is greater than or equal to a second threshold or the similarity is the highest.

In an embodiment, when the target desktop folder in which the downloaded APP is to be clustered is not determined, the method further includes: obtaining type information of a second APP on the terminal device according to a preset rule; determining, in the APP market APP, a similarity between the type information of the downloaded APP and the type information of the second APP of a plurality of APPs on the terminal device according to the similarity algorithm, where the second APP is an APP on the terminal device, and the second APP is not clustered into a desktop folder on the terminal device; generating a third desktop folder when the similarity is greater than or equal to the second threshold or the similarity is the highest; naming the third desktop folder according to the type information of the currently downloaded APP and/or the type information of the second APP; and clustering the currently downloaded APP and the second APP into the third desktop folder.

In an embodiment, when the downloaded APP is a multi-purpose APP, the method further includes: determining the type information of the downloaded APP according to historical download data and/or search data of a user.

According to the method, a type of a multi-purpose APP can be determined in a personalized manner, and APP clustering can be performed more accurately, meeting a user requirement.

In an embodiment, the obtaining type information of a second APP on the terminal device according to a preset rule includes: obtaining the type information of the second APP from download information of the second APP; sending a query message to a server when the type information of the second APP does not exist in the download information of the second APP, where the query message indicates the server to search for the type information of the second APP; receiving a feedback message sent by the server, where the feedback message includes the type information of the second APP; and obtaining the type information of the second APP according to the feedback message.

In an embodiment, the obtaining type information of a second APP on the terminal device according to a preset rule includes: predicting the type information of the second APP according to a machine learning model when the received feedback message sent by the server indicates that the type information of the second APP is not found.

It should be understood that the obtaining type information of a second APP on the terminal device according to a preset rule may include attempts in different obtaining manners according to a priority sequence as required.

In an embodiment, the method further includes: generating a fourth desktop folder when the target desktop folder in which the downloaded APP is to be clustered is not obtained; naming the fourth desktop folder according to the type of the downloaded APP; and adding the downloaded APP to the fourth desktop folder.

In an embodiment, the method further includes: reminding the user of the target desktop folder in which the downloaded APP is located.

In an embodiment, the method further includes: sending an update message to the server, where the update message indicates the server to update, based on an operation of managing a desktop folder of the terminal device and/or an APP included in the desktop folder, desktop data of the terminal device that is stored at the server end.

According to a second aspect, an application program APP management method is provided. The method is applicable to a server, and the method includes: receiving a request message sent by a first terminal device, where the request message is used to request the server to obtain a target desktop folder in which an APP downloaded by the first terminal device is to be clustered; obtaining, according to type information of the APP downloaded by the first terminal device and attribute information of a desktop folder on the first terminal device, the target desktop folder in which the downloaded APP is to be clustered; and sending a feedback message to the first terminal device, where the feedback message includes a name of the target desktop folder.

In an embodiment, the application server is a server of application programs.

In an embodiment, the attribute information of the desktop folder includes a name of the desktop folder or type information of an APP in the desktop folder.

In an embodiment, that the target desktop folder in which the downloaded APP is to be clustered is obtained according to the type of the APP downloaded by the first terminal device and the attribute information of the desktop folder on the first terminal device includes: determining a similarity between the type information of the downloaded APP and a name of a first desktop folder according to a similarity algorithm, where the first desktop folder is any desktop folder on the first terminal device; and determining the first desktop folder as the target desktop folder when the similarity is greater than or equal to a first threshold or the similarity is the highest.

In an embodiment, that the target desktop folder in which the downloaded APP is to be clustered is obtained according to the type of the APP downloaded by the first terminal device and the attribute information of the desktop folder on the first terminal device includes: determining a similarity between the type information of the downloaded APP and type information of a first APP according to a similarity algorithm, where the first APP is an APP in a second desktop folder on the first terminal device; and determining the second desktop folder as the target desktop folder when the similarity is greater than or equal to a second threshold or the similarity is the highest.

In an embodiment, when the target desktop folder in which the downloaded APP is to be clustered is not determined, the method further includes: obtaining type information of a second APP on the first terminal device according to a preset rule; determining a similarity between the type information of the downloaded APP and the type information of the second APP of a plurality of APPs on the first terminal device according to the similarity algorithm, where the second APP is an APP on the first terminal device, and the second APP is not clustered into a desktop folder on the first terminal device; generating a third desktop folder when the similarity is greater than or equal to the second threshold or the similarity is the highest; naming the third desktop folder according to the type information of the currently downloaded APP and/or the type information of the second APP; and clustering the currently downloaded APP and the second APP into the third desktop folder.

In an embodiment, when the downloaded APP is a multi-purpose APP, the method further includes: determining the type information of the downloaded APP according to historical download data and/or search data of a user.

In an embodiment, the obtaining type information of a second APP on the terminal device according to a preset rule includes: obtaining the type information of the second APP from download information of the second APP; and predicting the type information of the second APP according to a machine learning model when the type information of the second APP does not exist in the download information of the second APP.

In an embodiment, the method further includes: generating a fourth desktop folder when the target desktop folder in which the downloaded APP is to be clustered is not obtained;

naming the fourth desktop folder according to the type of the downloaded APP; and sending the feedback message to the first terminal device, where the feedback message includes a name of the fourth desktop folder.

In an embodiment, the method further includes: sending a reminder message to the first terminal device, where the reminder message is used to remind a user of the target desktop folder in which the downloaded APP is located.

In an embodiment, before the obtaining, according to type information of the APP downloaded by the first terminal device and attribute information of a desktop folder on the first terminal device, the target desktop folder in which the downloaded APP is to be clustered, the method further includes: obtaining the type information of the APP downloaded by the first terminal device and the attribute information of the desktop folder on the first terminal device.

In an embodiment, the method further includes: managing a desktop folder of the first terminal device and/or an APP included in the desktop folder; and sending an update message to the first terminal device, where the update message indicates the first terminal device to update the desktop folder of the first terminal device and/or the APP included in the desktop folder.

In an embodiment, the method further includes: receiving a request message sent by a second terminal device, where the request message is used to request to replicate desktop data of the first terminal device, and the desktop data includes a desktop folder of the first terminal device, an APP included in the desktop folder of the first terminal device, and an APP not included in the desktop folder of the first terminal device; and sending desktop data information of the first terminal device to the second terminal device.

In an embodiment, the method further includes: sending an update message to the third terminal device when the desktop data of the first terminal device changes. The desktop data information includes a desktop folder of the first terminal device, an APP included in the desktop folder of the first terminal device, and an APP not included in the desktop folder of the first terminal device. The update message is used to update changed desktop data of the first terminal device to the third terminal device. The first terminal device and the third terminal device are already registered with the server, or the first terminal device has a binding relationship with the third terminal device.

According to a third aspect, a method for replicating data between different terminal devices is provided. The method is applicable to a server, and the method includes: receiving a request message sent by a second terminal device, where the request message is used to request to replicate desktop data of a first terminal device, the server stores the desktop data of the first terminal device, and the desktop data includes a desktop folder of the first terminal device, an APP included in the desktop folder of the first terminal device, and an APP not included in the desktop folder of the first terminal device; and sending the desktop data of the first terminal device to the second terminal device.

In an embodiment, the method further includes: managing a desktop folder of the first terminal device and/or an APP included in the desktop folder; and sending a first update message to the first terminal device, where the update message indicates the first terminal device to update the desktop folder of the first terminal device and/or the APP included in the desktop folder. The first terminal device updates, according to a management operation of the server, the desktop folder of the first terminal device and/or the APP included in the desktop folder.

In an embodiment, the method further includes: receiving a second update message sent by the first terminal device, where the second update message indicates the server to update the desktop folder of the first terminal device and/or the APP included in the desktop folder that are/is stored at the server end; and updating, according to the second update message, the desktop folder of the first terminal device and/or the APP included in the desktop folder. That the server updates the desktop folder of the first terminal device and/or the APP included in the folder may also be that the server manages the desktop folder of the first terminal device and/or the APP included in the folder.

In an embodiment, the method further includes: sending an update message to the third terminal device when the desktop data of the first terminal device changes, where the update message is used to update changed desktop data of the first terminal device to the third terminal device. The first terminal device and the third terminal device are already registered with the server, or the first terminal device has a binding relationship with the third terminal device.

According to a fourth aspect, a terminal device is provided, including: an obtaining unit, where the obtaining unit is configured to obtain, according to type information of an APP downloaded by the terminal device and attribute information of a desktop folder on the terminal device, a target desktop folder in which the downloaded APP is to be clustered; and a processing unit, where the processing unit is configured to cluster the downloaded APP into the target desktop folder.

In an embodiment, the obtaining unit may obtain, according to the type information of the APP downloaded by the terminal device and the attribute information of the desktop folder on the terminal device, the target desktop folder in which the downloaded APP is to be clustered in an APP market APP and other software through which an application program can be downloaded; and the processing unit is configured to cluster the downloaded APP into the target desktop folder.

In an embodiment, the attribute information of the desktop folder includes a name of the desktop folder or type information of an APP in the desktop folder.

In an embodiment, the obtaining unit is configured to: determine a similarity between the type information of the downloaded APP and a name of a first desktop folder according to a similarity algorithm, where the first desktop folder is any desktop folder on the terminal device; and determine the first desktop folder as the target desktop folder when the similarity is greater than or equal to a first threshold or the similarity is the highest.

In an embodiment, the obtaining unit is configured to: determine a similarity between the type information of the downloaded APP and type information of a first APP according to a similarity algorithm, where the first APP is an APP in a second desktop folder on the terminal device; and determine the second desktop folder as the target desktop folder when the similarity is greater than or equal to a second threshold or the similarity is the highest.

In an embodiment, the obtaining unit is further configured to: obtain type information of a second APP on the terminal device according to a preset rule; determine, in the APP market APP, a similarity between the type information of the downloaded APP and the type information of the second APP of a plurality of APPs on the terminal device according to the similarity algorithm, where the second APP is an APP on the terminal device, and the second APP is not clustered into a desktop folder on the terminal device; generate a third desktop folder when the similarity is greater than or equal to the second threshold or the similarity is the highest; name the third desktop folder according to the type information of the currently downloaded APP and/or the type information of the second APP; and cluster the currently downloaded APP and the second APP into the third desktop folder.

In an embodiment, the processing unit is further configured to: determine, in the APP market APP, the type information of the downloaded APP according to historical download data and/or search data of a user.

In an embodiment, the obtaining unit is configured to obtain the type information of the second APP from download information of the second APP; and the terminal device further includes a transceiver unit. The transceiver unit is configured to send a query message to a server, where the query message indicates the server to search for the type information of the second APP; and the transceiver unit is further configured to receive a feedback message sent by the server, where the feedback message includes the type information of the second APP. The obtaining unit is further configured to obtain the type information of the second APP according to the feedback message.

In an embodiment, the obtaining unit is further configured to predict the type information of the second APP according to a machine learning model when the received feedback message sent by the server indicates that the type information of the second APP is not found.

In an embodiment, the processing unit is further configured to: generate a fourth desktop folder when the target desktop folder in which the downloaded APP is to be clustered is not obtained; name the fourth desktop folder according to a type of the downloaded APP; and add the downloaded APP to the fourth desktop folder.

In an embodiment, the processing unit is further configured to: remind the user of the target desktop folder in which the downloaded APP is located.

In an embodiment, the transceiver unit is further configured to: send an update message to the server, where the update message indicates the server to update, based on an operation of managing a desktop folder of the terminal device and/or an APP included in the desktop folder, a desktop folder of the terminal device and/or an APP included in the desktop folder that are/is stored at the server end.

According to a fifth aspect, a server is provided, including: a transceiver unit, where the transceiver unit is configured to receive a request message sent by a first terminal device, the request message is used to request the server to obtain a target desktop folder in which an APP downloaded by the first terminal device is to be clustered, and a client APP of the APP market is installed on the first terminal device; and a processing unit, where the processing unit is configured to obtain, according to type information of the APP downloaded by the first terminal device and attribute information of a desktop folder on the first terminal device, the target desktop folder in which the downloaded APP is to be clustered. The transceiver unit is further configured to send a feedback message to the first terminal device, where the feedback message includes a name of the target desktop folder.

In an embodiment, the attribute information of the desktop folder includes a name of the desktop folder or type information of an APP in the desktop folder.

In an embodiment, the processing unit is configured to: determine a similarity between the type information of the downloaded APP and a name of a first desktop folder according to a similarity algorithm, where the first desktop folder is any desktop folder on the first terminal device; and determine the first desktop folder as the target desktop folder when the similarity is greater than or equal to a first threshold or the similarity is the highest.

In an embodiment, the processing unit is further configured to: determine a similarity between the type information of the downloaded APP and type information of a first APP according to a similarity algorithm, where the first APP is an APP in a second desktop folder on the first terminal device; determine the second desktop folder as the target desktop folder when the similarity is greater than or equal to a second threshold or the similarity is the highest.

In an embodiment, the processing unit is further configured to: obtain type information of a second APP on the first terminal device according to a preset rule; determine a similarity between the type information of the downloaded APP and the type information of the second APP of a plurality of APPs on the first terminal device according to the similarity algorithm, where the second APP is an APP on the first terminal device, and the second APP is not clustered into a desktop folder on the first terminal device; generate a third desktop folder when the similarity is greater than or equal to the second threshold or the similarity is the highest; name the third desktop folder according to the type information of the currently downloaded APP and/or the type information of the second APP; and cluster the currently downloaded APP and the second APP into the third desktop folder.

In an embodiment, when the downloaded APP is a multipurpose APP, the processing unit is further configured to: determine the type information of the downloaded APP according to historical download data and/or search data of a user.

In an embodiment, the processing unit is configured to:
obtain the type information of the second APP from download information of the second APP; and predict the type information of the second APP according to a machine learning model when the type information of the second APP does not exist in the download information of the second APP.

In an embodiment, the processing unit is further configured to: generate a fourth desktop folder when the target desktop folder in which the downloaded APP is to be clustered is not obtained; name the fourth desktop folder according to a type of the downloaded APP; and send the feedback message to the first terminal device, where the feedback message includes a name of the fourth desktop folder.

In an embodiment, the transceiver unit is further configured to: send a reminder message to the first terminal device, where the reminder message is used to remind a user of the target desktop folder in which the downloaded APP is located.

In an embodiment, the transceiver unit is further configured to: obtain the type information of the APP downloaded by the first terminal device and the attribute information of the desktop folder on the first terminal device.

In an embodiment, the processing unit is configured to manage a desktop folder of the first terminal device and/or an APP included in the desktop folder; and the transceiver unit is further configured to send an update message to the first terminal device, where the update message indicates the first terminal device to update the desktop folder of the first terminal device and/or the APP included in the desktop folder.

In an embodiment, the transceiver unit is further configured to: receive a request message sent by a second terminal device, where the request message is used to request to replicate desktop data of the first terminal device, and the desktop data includes a desktop folder of the first terminal device, an APP included in the desktop folder of the first terminal device, and an APP not included in the desktop folder of the first terminal device; and send desktop data information of the first terminal device to the second terminal device.

In an embodiment, the transceiver unit is further configured to: send an update message to the third terminal device when the desktop data of the first terminal device changes. The desktop data information includes a desktop folder of the first terminal device, an APP included in the desktop folder of the first terminal device, and an APP not included in the desktop folder of the first terminal device. The update message is used to update changed desktop data of the first terminal device to the third terminal device. The first terminal device and the third terminal device are already registered with the server, or the first terminal device has a binding relationship with the third terminal device.

According to a sixth aspect, a server is provided. The server includes: a receiving unit, where the receiving unit is configured to receive a request message sent by a second terminal device, where the request message is used to request to replicate desktop data of a first terminal device, the server stores the desktop data of the first terminal device, and the desktop data includes a desktop folder of the first terminal device, an APP included in the desktop folder of the first terminal device, and an APP not included in the desktop folder of the first terminal device; and a sending unit, where the sending unit is configured to send the desktop data of the first terminal device to the second terminal device.

In an embodiment, the server further includes a processing unit. The processing unit is configured to manage a desktop folder of the first terminal device and/or an APP included in the desktop folder. The sending unit is configured to send a first update message to the first terminal device, where the update message indicates the first terminal device to update the desktop folder of the first terminal device and/or the APP included in the desktop folder. The first terminal device updates, according to a management operation of the server, the desktop folder of the first terminal device and/or the APP included in the desktop folder.

In an embodiment, the receiving unit is further configured to receive a second update message sent by the first terminal device, where the second update message indicates the server to update the desktop folder of the first terminal device and/or the APP included in the desktop folder that are/is stored at the server end; and the desktop folder of the first terminal device and/or the APP included in the desktop folder are/is updated according to the second update message. That the server updates the desktop folder of the first terminal device and/or the APP included in the folder may also be that the server manages the desktop folder of the first terminal device and/or the APP included in the folder.

In an embodiment, the sending unit is further configured to: send an update message to the third terminal device when the desktop data of the first terminal device changes. The update message is used to update changed desktop data of the first terminal device to the third terminal device. The first terminal device and the third terminal device are already registered with the server, or the first terminal device has a binding relationship with the third terminal device.

According to a seventh aspect, a system is provided. The system includes the terminal device according to any one of the fourth aspect or the embodiments of the fourth aspect, the server according to any one of the fifth aspect or the embodiments of the fifth aspect, and the server according to any one of the sixth aspect or the embodiments of the sixth aspect.

According to a ninth aspect, a terminal device is provided. The encoding device includes at least one processor and a memory. The at least one processor is configured to perform the method according to any one of the first aspect or the embodiments of the first aspect.

According to a tenth aspect, a server is provided. The decoding device includes at least one processor and an interface circuit. The at least one processor is configured to perform the method according to any one of the second aspect or the embodiments of the second aspect, or the method according to any one of the third aspect or the embodiments of the third aspect.

According to an eleventh aspect, a computer program product is provided. The computer program product includes a computer program. When the computer program is executed by a processor, the computer program is used to perform the method according to any one of the first aspect or the embodiments of the first aspect, the method according to any one of the second aspect or the embodiments of the second aspect, or the method according to any one of the third aspect or the embodiments of the third aspect.

According to a twelfth aspect, a computer-readable storage medium is provided. The computer-readable storage medium stores a computer program. When the computer program is executed, the computer program is used to perform the method according to any one of the first aspect or the embodiments of the first aspect, the method according to any one of the second aspect or the embodiments of the second aspect, or the method according to any one of the third aspect or the embodiments of the third aspect.

According to a thirteenth aspect, a chip is provided. The chip includes: a processor, configured to invoke a computer program from a memory and run the computer program, to enable a communication device in which the chip is installed to perform the method according to any one of the first aspect or the embodiments of the first aspect, the method according to any one of the second aspect or the embodiments of the second aspect, or the method according to any one of the third aspect or the embodiments of the third aspect.

In an embodiment, the chip may further include a memory. The memory stores instructions, and the processor is configured to execute the instructions stored in the memory or other instructions.

DESCRIPTION OF EMBODIMENTS

The following describes technical solutions of this application with reference to accompanying drawings.

To better understand this application, terms that may appear in embodiments of this application are first explained.

APP market: a tool that provides APP search management and download services. For example, Huawei mobile APP market, Google APP market (Google Play), and Apple mobile APP market (APP Store). The APP market includes a client and a server. The client is usually installed on a terminal device.

APP clustering: One or more APPs are clustered into one desktop folder for management because of a same or similar category. For example, a desktop folder named "Video Player" may include APPs such as "Xunlei Video Player", "iQIYI", and "Tencent Video Player".

Figure 1:
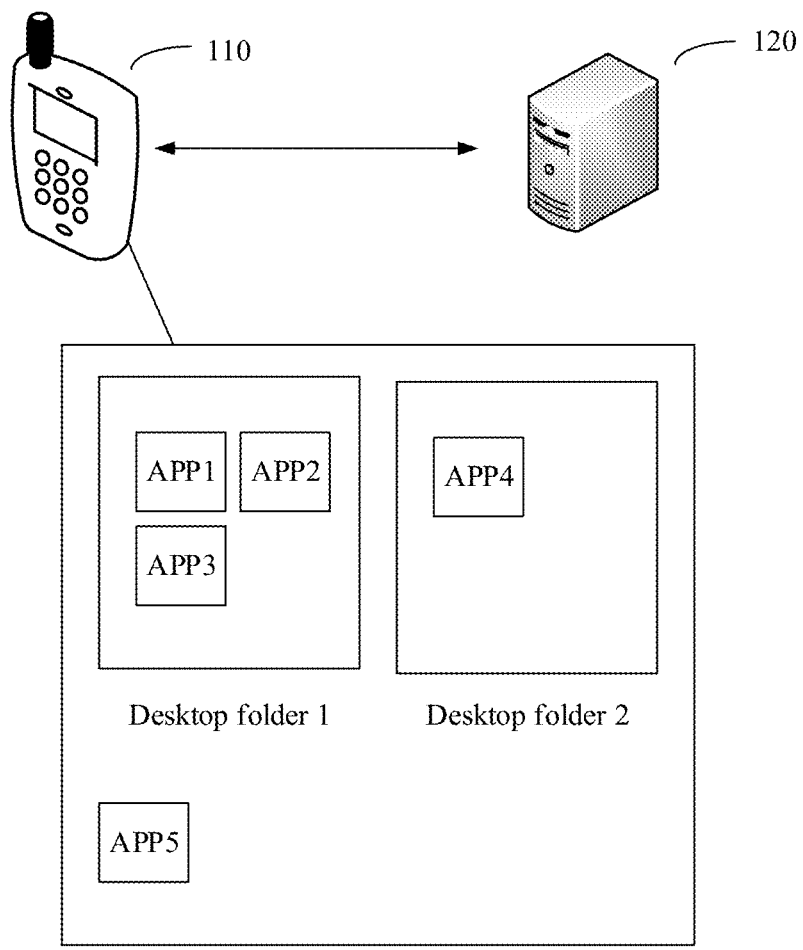
FIG. 1 is an example of a schematic diagram of a system according to an embodiment.

The following describes an application scenario in embodiments of this application. FIG. 1 is an example of a schematic diagram of a system 100 according to an embodiment. As shown in FIG. 1, the system 100 includes a terminal device 110 and a server 120. A client of an APP market is installed on the terminal device 110, and a server end of the APP market is the server 120. The terminal device 110 and the server 120 may send messages to each other. A desktop of the terminal device 110 includes a desktop folder 1 and a desktop folder 2. The desktop folder 1 includes an APP1, an APP2, and an APP3. The desktop folder 2 includes an APP4. The terminal device 110 further includes an APPS that is not clustered into a desktop folder. The desktop folder 1 and the desktop folder 2 may be manually created by a user based on a requirement. It should be understood that the terminal device 110 in FIG. 1 is merely an example, and the terminal device 110 may include more APPs.

With development of Internet technologies, a smart terminal device is indispensable in daily life. More APPs are downloaded on the smart terminal device. Most people have at least dozens or hundreds of APPs on smart terminal devices. It is troublesome to find a wanted APP from a plurality of APPs on the smart terminal device. In addition, too many APPs clutter a screen and it is hard to find and access wanted APPs through pages. A good method is to cluster APPs of a same type in a same desktop folder. However, it is time-consuming and laborious for a user to manually cluster APPs of a same type into a folder one by one. In addition, it is troublesome for the user to manually cluster a downloaded APP in an appropriate desktop folder each time.

In view of this, this application proposes an application APP management method, to automatically cluster an APP downloaded on a terminal device. This saves time of a user and improves user experience.

It should be understood that FIG. 1 is merely an example diagram of architecture. In addition to the devices shown in FIG. 1, the system 100 may include another terminal device or server. This is not limited in this embodiment of this application.

Embodiments of this application are described with reference to a terminal device. The terminal device in embodiments of this application may also be referred to as user equipment (UE), a mobile station (MS), a mobile terminal (MT), an access terminal, a subscriber unit, a subscriber station, a mobile station, a mobile console, a remote station, a remote terminal, a mobile device, a user terminal, a terminal, a wireless communication device, a user agent, a user apparatus, or the like.

The terminal device may be a wireless terminal or a wired terminal. The wireless terminal may refer to a device that provides a user with voice and/or other service data connectivity, a handheld device with a wireless connection function, or another processing device connected to a wireless modem. The wireless terminal may communicate with one or more core networks through a radio access network (RAN). The wireless terminal may be a mobile terminal, for example, a mobile phone (which is also referred to as a "cellular" phone) or a computer having a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless phone, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, a remote terminal, an access terminal, a user terminal, a user agent, user equipment (or user device), a mobile internet device (MID), a wearable device, a virtual reality (VR) device, an augmented reality (AR) device, a wireless terminal in industrial control, a wireless terminal in self driving, a wireless terminal in remote surgery (or remote medical surgery), a wireless terminal in smart grid, a wireless terminal in transportation safety, a wireless terminal in smart city, a wireless terminal in smart home, a vehicle-mounted device, a wearable device, a terminal device in a 5G network, a terminal device in a future evolved public land mobile network (PLMN), or the like. This is not limited in embodiments of this application.

By way of example and not limitation, in embodiments of this application, the wearable device may also be referred to as a wearable intelligent device, and is a generic term for wearable devices such as glasses, gloves, watches, clothes, and shoes that are developed based on intelligent design of daily wearing by using wearable technologies. The wearable device is a portable device that can be directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

In addition, in embodiments of this application, the terminal device may alternatively be a terminal device in an internet of things (IoT) system. IoT is an important part of future information technology development. A main technical feature of the IoT is connecting things to networks by using communication technologies, to implement an intelligent network for interconnection between persons and machines, and between things.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (OBU).

In some embodiments, the terminal device may further include a relay. Alternatively, it is understood as that any device that can perform data communication with a base station may be considered as a terminal device.

Figure 2:
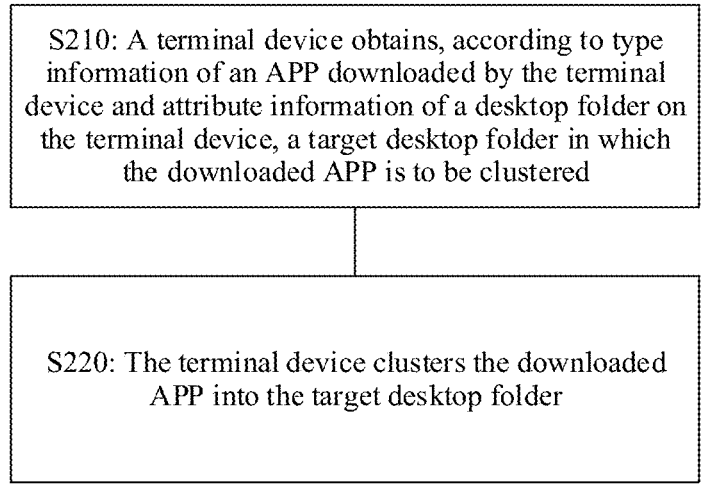
FIG. 2 is a schematic flowchart of an application program APP management method according to an embodiment.

An application APP management method provided in this application is described below in detail with reference to FIG. 2. FIG. 2 is a schematic flowchart of an application APP management method 200 according to an embodiment. The method 200 may be applied to the scenario shown in FIG. 1, or certainly may be applied to another scenario. This is not limited in this embodiment of this application.

It should be further understood that, in this embodiment of this application, the method is described by using an example in which the method is performed by a terminal device. By way of example but not limitation, the method may alternatively be performed by a chip, a chip system, a processor, or the like used in the terminal device.

As shown in FIG. 2, the method 200 shown in FIG. 2 may include S210 and S220. The following describes in detail each operation in the method 200 with reference to FIG. 2.

S210: A terminal device obtains, according to type information of an APP downloaded by the terminal device and attribute information of a desktop folder on the terminal device, a target desktop folder in which the downloaded APP is to be clustered.

S220: The terminal device clusters the downloaded APP into the target desktop folder.

Therefore, the terminal device obtains, according to the type information of the APP downloaded by the terminal device and the attribute information of the desktop folder on the terminal device, the target desktop folder in which the downloaded APP is to be clustered; and clusters the downloaded APP into the target desktop folder. The APP downloaded on the terminal device can be automatically clustered, and the APP is automatically placed in a correct desktop folder, without a manual user operation.

In an embodiment, the terminal device may perform operation S210 and operation S220 by using an APP market APP installed on the terminal device. That is, the target desktop folder in which the downloaded APP is to be clustered is obtained in the APP market APP according to the type information of the APP downloaded by the terminal device and the attribute information of the desktop folder on the terminal device; and the downloaded APP is clustered into the target desktop folder. According to the method, the APP downloaded on the terminal device can be automatically clustered in the APP market APP. In addition, because the APP market is requisite software of a mobile phone, a user does not need to install other software. Existing APPs can be automatically clustered and placed in correct desktop folders in a convenient and efficient manner without interfering with an original mobile phone system. In addition, each time an APP is downloaded, the APP is automatically clustered, without a manual user operation.

It should be further understood that this method may also be used in other similar software through which an APP can be downloaded to manage the APP of the terminal device.

In an embodiment, the attribute information of the desktop folder includes a name of the desktop folder or type information of an APP in the desktop folder.

For example, the name of the desktop folder may be "game", "video", "job hunting", or the like, and the type information of the APP in the desktop folder may be a stand-alone game, an online game, or the like. For example, type information of "Happy Eliminating" is stand-alone game. Type information of "Honor of Kings" is online game.

In an embodiment, that the target desktop folder in which the downloaded APP is to be clustered is obtained according to the type of the APP downloaded by the terminal device and the attribute information of the desktop folder on the terminal device includes: determining a similarity between the type information of the downloaded APP and a name of a first desktop folder according to a similarity algorithm, where the first desktop folder is any desktop folder on the terminal device; and determining the first desktop folder as the target desktop folder when the similarity is greater than or equal to a first threshold or the similarity is the highest.

In an embodiment, the terminal device automatically discovers, in the APP market APP, a name of a desktop folder and the type information of the downloaded APP; determines the similarity between the type information of the downloaded APP and the name of the first desktop folder; determines whether the names are the same or similar according to the similarity; and places the downloaded APP in the first desktop folder when the similarity is greater than or equal to the first threshold or the similarity is the highest. For example, if the user's mobile phone already has a desktop folder "Music", when the user downloads "Xiami Music" from the APP market, the APP is automatically placed in the desktop folder "Music".

It should be understood that, if a plurality of first desktop folders whose similarity is greater than the first threshold are determined through determining, a first desktop folder with a highest similarity may be selected as the target desktop folder. Alternatively, any first desktop folder may be selected from the plurality of first desktop folders whose similarity is greater than the first threshold as the target desktop folder.

It should be further understood that the terminal device may determine, in the APP market according to the similarity algorithm, whether category information of the APP is similar to a name of an existing desktop folder of the user, and then place, according to the first threshold, the APP into a most similar desktop folder that meets the threshold. The similarity algorithm includes but is not limited to: calculating a cosine similarity between a semantic vector of a name and a semantic vector of a desktop folder name (the semantic vector is obtained through modeling based on search data of an APP market); determining a hierarchical relationship of categories by using a knowledge graph, and determining whether the name and the folder name have a hierarchical relationship (for example, a game is superordinate to a gun game); and identifying, according to a data mining algorithm, whether the name and the folder name have a same meaning or are synonyms.

In an embodiment, that the target desktop folder in which the downloaded APP is to be clustered is obtained according to the type of the APP downloaded by the terminal device and the attribute information of the desktop folder on the terminal device includes: determining a similarity between the type information of the downloaded APP and type information of a first APP according to a similarity algorithm, where the first APP is any APP in the desktop folder and a desktop folder in which the first APP is located is a second desktop folder; and determining the second desktop folder as the target desktop folder when the similarity is greater than or equal to a second threshold or the similarity is the highest.

In an embodiment, the terminal device automatically discovers, in the APP market APP, type information of an APP in a desktop folder and the type information of the downloaded APP; determines the similarity between the type information of the downloaded APP and the type information of the first APP in the desktop folder; determines whether the names are the same or similar according to the similarity; and places the downloaded APP in the second desktop folder in which the first APP is located when the similarity is greater than or equal to the second threshold or the similarity is the highest. The terminal device may calculate a similarity score of two APPs in the APP market according to an algorithm such as APP construction vector embedding; after the threshold is satisfied, select an APP with a highest similarity, or determine, based on some rules such as a hierarchical relationship of APP categories, whether the two APPs are similar; and calculate a similarity. If an APP that meets the conditions is found, automatic clustering is performed, and the downloaded APP is placed in a corresponding desktop folder in which the APP with the highest similarity is located.

It should be understood that, if a plurality of first APPs whose similarity is greater than the second threshold are determined through determining, a desktop folder in which a first APP with a highest similarity is located may be selected as the target desktop folder. Alternatively, any first APP may be selected from the plurality of first APPs whose similarity is greater than the second threshold, and a desktop folder in which the any first APP is located is selected as the target desktop folder.

In an embodiment, when the target desktop folder in which the currently downloaded APP is to be clustered is not determined according to the type information of the APP downloaded by the terminal device and the attribute information of the desktop folder on the terminal device, the method 200 further includes: obtaining type information of a second APP on the terminal device according to a preset rule; determining a similarity between the type information of the downloaded APP and the type information of the second APP of a plurality of APPs on the terminal device according to the similarity algorithm, where the second APP is an APP on the terminal device, and the second APP is not clustered into a desktop folder on the terminal device; generating a third desktop folder when the similarity is greater than or equal to the second threshold or the similarity is the highest; naming the third desktop folder according to the type information of the currently downloaded APP and/or the type information of the second APP; and clustering the currently downloaded APP and the second APP into the third desktop folder.

In an embodiment, an APP that is not clustered on the terminal device may exist mainly due to the following two reasons.

(1) A system version installed on the terminal device is continuously upgraded. If an APP market installed on the terminal device does not previously support automatic APP clustering, the desktop folder of the terminal device may be manually clustered by the user. Alternatively, the user may feel troublesome and does not cluster APPs on the desktop, leaving an APP not clustered on the desktop. A system of the terminal device is upgraded, and the upgraded APP market supports automatic APP clustering.

(2) Many other APP market APPs (APP market APPs not built in the terminal device) are available for the user on the terminal device, for example, Tencent MyApp and Google Play of Google. The user may also directly download an APP from a uniform resource locator (Uniform Resource Locator, URL) address for installation, and no desktop folder is automatically created. If the terminal device is a Huawei mobile phone that has a built-in Huawei APP market APP, the user can also download other APP markets, such as Tencent MyApp. If the user downloads an APP from Tencent MyApp, the downloaded APP will not be clustered.

When the target desktop folder in which the downloaded APP is to be clustered is not determined in the APP market according to the type information of the APP downloaded by the terminal device and the attribute information of the desktop folder on the terminal device, the terminal device determines the similarity between the type information of the downloaded APP and the type information of the second APP on the terminal device, where the second APP is an APP not clustered into a desktop folder on the terminal device; generates the third desktop folder when the similarity is greater than or equal to the second threshold or the similarity is the highest; names the third desktop folder according to the type information of the currently downloaded APP and/or the type information of the second APP; and clusters the currently downloaded APP and the second APP into the third desktop folder. For example, if "Youku Video" has been installed on the user's mobile phone, when the user downloads "Tencent Video" from the APP market, the APP market automatically creates a desktop folder "Video" on the user's mobile phone, and places "Tencent Video" and "Youku Video" in the desktop folder, so that the user can easily manage existing APPs of the same type.

In an embodiment, when the downloaded APP is a multi-purpose APP, the method 200 further includes: determining the type information of the downloaded APP according to historical download data and/or search data of the user.

In an embodiment, some APPs are multi-purpose APPs. "58.com" is used as an example. "58.com" can be used for house search or job hunting. Type information of "58.com" in the APP market may be "house search", but the user downloads "58.com" for job hunting. If the default type information "house search" of "58.com" in the APP market is used, "58.com" may be clustered into a "House Purchase" folder based on the default type information in the APP market. Obviously, the clustering is inappropriate. Therefore, for the multi-purpose APP, the terminal device may find, based on data such as a search record and download information of the user, that the user uses the APP for a purpose of "job hunting". Therefore, the type information of "58.com" is updated to "job hunting" in the APP market, and clustering is performed based on the updated type information of "58.com", so that "58.com" can be accurately clustered into a "Job Hunting" folder. The type information of the downloaded APP may be defined based on historical download data and/or search data of the user. For example, a multi-purpose APP such as "58.com" is currently downloaded on the terminal device. If a plurality of APPs for job hunting have been downloaded on the terminal device, the type information of "58.com" APP is defined as job hunting, and the APP may be clustered into a desktop folder of "job hunting". If a plurality of APPs for second-hand shopping are downloaded on the terminal device, the type information of the "58.com" APP is defined as second-hand transaction, and the APP may be clustered into a desktop folder of "Second-hand Transaction".

The terminal device may determine, in the APP market, the type information of the APP according to a personalized algorithm. The personalized algorithm includes but is not limited to: The terminal device creates a user profile in the APP market based on a historical download and use behavior of the user, a mobile phone model, and the like, where the user profile may identify a user feature, for example, the user is a teacher or a driver. Then, a purpose of use is determined based on searches, clicks, and download behaviors of the user in a recent period of time, and a personalized name is found in a tag or another attribute of the APP. For example, a category name of the APP 58.com is house rent and house purchase. An existing desktop folder of the user does not have content that is the same as or similar to the category name. Then, a tag of the APP is obtained: ticket service, job hunting, designated driving, and the like. An intent of the user is determined according to the personalized algorithm, a tag that meets a requirement is found: job hunting, and the type information of the APP is determined as job hunting.

According to the method, a type of a multi-purpose APP can be determined in a personalized manner, and APP clustering can be performed more accurately, meeting a user requirement.

In an embodiment, the method 200 further includes: obtaining the type information of the second APP from download information of the second APP; sending a query message to a server when the type information of the second APP does not exist in the download information of the second APP, where the query message indicates the server to search for the type information of the second APP; receiving, by the server, the query message, searching for the type information of the second APP, and sending a feedback message to the terminal device; receiving, by the terminal device, the feedback message sent by the server; and obtaining the type information of the second APP according to the feedback message.

In an embodiment, a second APP that is not clustered exists on the terminal device. If type information of the APP that is not clustered cannot be found in the APP market of the terminal device, the terminal device may send the query message to the server. The server is a server end of the APP market. After receiving the query message, the server queries the type information of the second APP, and notifies the terminal device of the type information of the second APP by using the feedback message.

In an embodiment, the method 200 further includes: predicting the type information of the second APP according to a machine learning model when the feedback message indicates to the terminal device that the type information of the second APP is not found.

In an embodiment, when the type information of the second APP is not found at the server end of the APP market, the terminal device may predict the type information of the second APP according to the machine learning model.

The machine learning model may be obtained through training in advance by using a machine learning algorithm, for example, a neural network algorithm. For example, a plurality of types of descriptive parameter information of an APP, other operation information used on the terminal device, for example, search information and download information of the user, and type information that is of the APP and that respectively corresponds to the plurality of types of descriptive parameter information and the other operation information may be input, to establish the machine learning model. A conventional technology may be relied on for a specific method for establishing the machine learning model, and details are not described in this application.

In an embodiment, the method 200 further includes: generating a fourth desktop folder when the target desktop folder in which the downloaded APP is to be clustered is not obtained; naming the fourth desktop folder according to a type of the downloaded APP; and adding the downloaded APP to the fourth desktop folder.

In an embodiment, if the terminal device fails to determine, in the APP market, the target desktop folder in which the downloaded APP is to be clustered, the terminal device automatically creates a desktop folder, for example, the fourth desktop folder; names the fourth desktop folder according to category information of the APP; and then places the downloaded APP in the fourth desktop folder.

In an embodiment, the method 200 further includes: reminding the user of the target desktop folder in which the downloaded APP is located.

In an embodiment, after the downloaded APP is clustered into the target desktop folder, the terminal device may remind, through the APP market in an obvious manner, the user of the desktop folder in which the downloaded APP is placed, so that the user can quickly find the desktop folder and the APP. For example, a reminder message may pop up in the APP market, or a reminder ringtone may be set.

In an embodiment, the method 200 further includes: The terminal device sends an update message to the server. The update message includes an operation of managing a desktop folder of the terminal device and/or an APP included in the desktop folder. The update message indicates the server to update, based on the operation of managing the desktop folder of the terminal device and/or the APP included in the desktop folder, desktop data of the terminal device that is stored at the server end. The desktop data includes a desktop folder of the first terminal device, an APP included in the desktop folder of the first terminal device, and an APP not included in the desktop folder of the first terminal device.

If the user changes a name of a desktop folder, an APP market client saves a correspondence between a desktop folder name changed by the user and an APP name at the server end. When the user downloads and installs a new APP later, the new APP may be placed in a folder with the changed name on the user mobile phone corresponding to the name at the server end.

Figure 3:
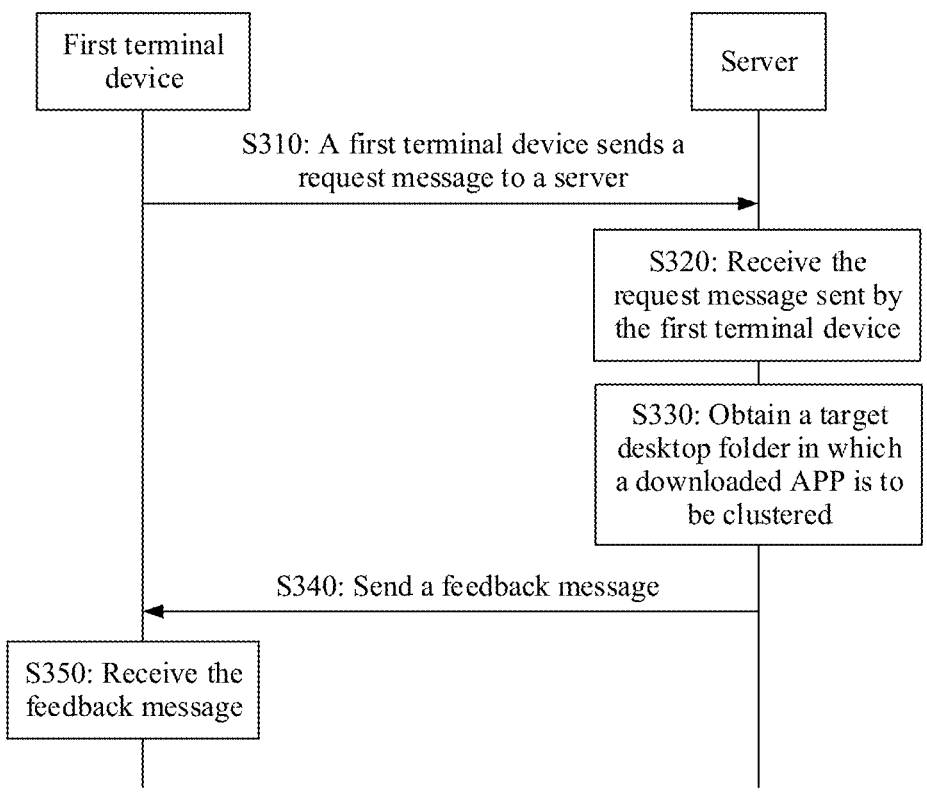
FIG. 3 is a schematic flowchart of an application program APP management method according to an embodiment.

An application APP management method provided in this application is described below in detail with reference to FIG. 3. FIG. 3 is a schematic flowchart of an application APP management method 300 according to an embodiment of this application. The method 300 may be applied to the scenario shown in FIG. 1, or certainly may be applied to another scenario. This is not limited in this embodiment of this application.

It should be further understood that, in this embodiment of this application, the method is described by using an example in which the method is performed by a server. By way of example but not limitation, the method may alternatively be performed by a chip, a chip system, a processor, or the like used in the server.

As shown in FIG. 3, the method 300 shown in FIG. 3 may include S310 and S350. The following describes in detail each operation in the method 300 with reference to FIG. 3.

S310: A first terminal device sends a request message to a server, where the request message is used to request the server to obtain a target desktop folder in which an APP downloaded by the first terminal device is to be clustered, the server is a server of an APP market, and a client APP of the APP market is installed on the first terminal device.

S320: The server receives the request message sent by the first terminal device.

S330: The server obtains, according to type information of the APP downloaded by the first terminal device and attribute information of a desktop folder on the first terminal device, the target desktop folder in which the downloaded APP is to be clustered.

S340: The server sends a feedback message to the first terminal device, where the feedback message includes a name of the target desktop folder.

S350: The first terminal device receives the sent feedback message, and clusters the downloaded APP into the target desktop folder.

It should be understood that, the server end automatically clusters an APP downloaded on the first terminal device, and sends a clustering result to the first terminal device, so that the APP downloaded on the terminal device can be automatically clustered, and existing APPs are automatically clustered and placed in correct desktop folders in a convenient and efficient manner. In addition, each time an APP is downloaded, the APP is automatically clustered, without a manual user operation.

In an embodiment, the server may be the server of the APP market, that is, the server and the client of the APP market that is installed on the first terminal device may form the APP market. Application programs are managed by using the APP market.

In an embodiment, the attribute information of the desktop folder includes a name of the desktop folder or type information of an APP in the desktop folder.

In an embodiment, that the target desktop folder in which the downloaded APP is to be clustered is obtained according to the type of the APP downloaded by the first terminal device and the attribute information of the desktop folder on the first terminal device includes: determining a similarity between the type information of the downloaded APP and a name of a first desktop folder according to a similarity algorithm, where the first desktop folder is any desktop folder on the first terminal device; and determining the first desktop folder as the target desktop folder when the similarity is greater than or equal to a first threshold or the similarity is the highest.

In an embodiment, that the target desktop folder in which the downloaded APP is to be clustered is obtained according to the type of the APP downloaded by the first terminal device and the attribute information of the desktop folder on the first terminal device includes: determining a similarity between the type information of the downloaded APP and type information of a first APP according to a similarity algorithm, where the first APP is an APP in the desktop folder and a desktop folder in which the first APP is located is a second desktop folder; and determining the second desktop folder as the target desktop folder when the similarity is greater than or equal to a second threshold or the similarity is the highest.

In an embodiment, when the target desktop folder in which the downloaded APP is to be clustered is obtained according to the type of the APP downloaded by the first terminal device and the attribute information of the desktop folder on the first terminal device, and the target desktop folder in which the downloaded APP is to be clustered is not determined, the method further includes: obtaining type information of a second APP on the first terminal device according to a preset rule; determining a similarity between the type information of the downloaded APP and the type information of the second APP of a plurality of APPS on the first terminal device according to the similarity algorithm, where the second APP is an APP on the first terminal device, and the second APP is not clustered into a desktop folder on the first terminal device; generating a third desktop folder when the similarity is greater than or equal to the second threshold or the similarity is the highest; naming the third desktop folder according to the type information of the currently downloaded APP and/or the type information of the second APP; and clustering the currently downloaded APP and the second APP into the third desktop folder.

In an embodiment, when the downloaded APP is a multi-purpose APP, the method 300 further includes: determining the type information of the downloaded APP according to historical download data and/or search data of the user.

In an embodiment, the method 300 further includes: obtaining the type information of the second APP from download information of the second APP; and predicting the type information of the second APP according to a machine learning model when the type information of the second APP does not exist in the download information of the second APP.

In an embodiment, the method further includes: generating a fourth desktop folder when the target desktop folder in which the downloaded APP is to be clustered is not obtained; and naming the fourth desktop folder according to the type of the downloaded APP.

The feedback message is sent to the first terminal device, where the feedback message includes a name of the fourth desktop folder.

In an embodiment, the method 300 further includes: sending a reminder message to the first terminal device, where the reminder message is used to remind a user of the target desktop folder in which the downloaded APP is located.

It should be understood that, in the plurality of embodiments above, for a specific operation of the server end, reference may be correspondingly made to the description of the terminal device. For example, for a method in which the server determines a desktop folder of an APP downloaded by the first terminal device, reference may be made to a method in which the terminal device determines a desktop folder of a downloaded APP. To avoid repetition, details are not described herein again.

In an embodiment, before the server obtains, according to type information of the APP downloaded by the first terminal device and attribute information of a desktop folder on the first terminal device, the target desktop folder in which the downloaded APP is to be clustered, the method 300 further includes: obtaining the type information of the APP downloaded by the first terminal device and the attribute information of the desktop folder on the first terminal device.

In an embodiment, obtaining the type information of the APP downloaded by the first terminal device and the attribute information of the desktop folder on the first terminal device may be classified into the following three cases: 1. An event-triggered case, where when the APP downloaded by the first terminal device and the desktop folder on the first terminal device change, for example, the user deletes an APP or a desktop folder, the first terminal device actively reports, to the server, the type information of the APP downloaded by the first terminal device and the attribute information of the desktop folder on the first terminal device after the change. 2. A periodicity-triggered case, where the first terminal device actively reports, to the server at a preset time, the type information of the APP downloaded by the first terminal device and the attribute information of the desktop folder on the first terminal device. 3. An event-triggered case, where after sending a request message to the server, the first terminal device reports, to the server, the type information of the APP downloaded by the first terminal device and the attribute information of the desktop folder on the first terminal device.

In an embodiment, that the server obtains the type information of the APP downloaded by the first terminal device and the attribute information of the desktop folder on the first terminal device needs to be permitted by the user, that is, with permission of the user, the server may obtain the type information of the APP downloaded by the first terminal device and the attribute information of the desktop folder on the first terminal device.

In an embodiment, the method 300 further includes: managing a desktop folder of the first terminal device and/or an APP included in the desktop folder; and sending an update message to the first terminal device, where the update message includes an operation of managing the desktop folder of the first terminal device and/or the APP included in the desktop folder.

In an embodiment, the client and the server of the APP market synchronously establish a relationship between an APP downloaded by the first terminal device and a corresponding desktop folder. The APP market provides an interface, and the user may manage an installed APP and a corresponding folder on the server (an operation such as adding, deleting, or changing a desktop folder name may be performed). The user modifies information about the folder and the downloaded APP at the server end, and the APP market performs data synchronization to update the desktop folder and the downloaded APP on the first terminal device in a timely manner, to keep desktop data consistency between the server and the first terminal device.

In an embodiment, the method 300 further includes: receiving a request message sent by a second terminal device, where the request message is used to request to replicate desktop data of the first terminal device, and the desktop data includes a desktop folder of the first terminal device, an APP included in the desktop folder of the first terminal device, and an APP not included in the desktop folder of the first terminal device; and sending the desktop data of the first terminal device to the second terminal device.

In an embodiment, an APP market client installed on the second terminal device is the same as the APP market client installed on the first terminal device, for example, both are the "Huawei" APP market. Both the APP market client installed on the first terminal device and the APP market client installed on the second terminal device correspond to the server, and the server is the server end of the APP market. The second terminal device may select a replication service, to download a desktop folder of the first terminal device and a corresponding APP that are stored at the server end to the second terminal device, and automatically create a desktop folder corresponding to the APP. The second terminal device and the first terminal device may be different terminal devices of a same user, or may be terminal devices of different users.

The second terminal device quickly and automatically replicates, through the server end of the APP market, a desktop folder of the first terminal device and an APP corresponding to the desktop folder, so that data replication between different terminal devices can be quickly implemented, and convenience of using the terminal device by the user is improved. When the user switches to another mobile phone, the user runs the APP market on the new mobile phone. The APP market provides an interface, and the user may select to replicate, by one click, all desktop folders and corresponding APPs that are stored at the server end, so that desktop folders and corresponding APP information of the original mobile phone of the user that are stored at the server end of the APP market are quickly replicated to the new mobile phone. This facilitates the user to maintain user interface consistency between the original and the new mobile phone at a low cost and high efficiency.

In an embodiment, the method further includes: sending an update message to the third terminal device when the desktop data of the first terminal device is updated. The update message is used to update changed desktop data of the first terminal device to the third terminal device. The first terminal device and the third terminal device are already registered with the server, or the first terminal device has a binding relationship with the third terminal device.

In an embodiment, that the desktop data of the first terminal device is updated may be that the user actively modifies the desktop data of the first terminal device through the server, or the user modifies the desktop data of the first terminal device on the first terminal device and synchronizes a modification operation to the server end. When the desktop data of the first terminal device is updated, the server sends the update message to the third terminal device, so that the third terminal device updates the updated desktop data of the first terminal device to the third terminal device according to the update message. It should be understood that the third terminal device and the first terminal device may be different terminal devices of a same user, or may be terminal devices of different users. If the third terminal device and the first terminal device are terminal devices of different users, the first terminal device and the third terminal device are already registered with the server in advance. For example, the user registers a plurality of terminal devices at the server end of the APP market. When the user modifies a desktop folder and a corresponding APP of a terminal device, the modification may be synchronized to the server end in real time, and the server may keep data synchronization with the plurality of terminal devices of the user in real time. It should be understood that the first terminal device and the third terminal device may be different terminal devices of a same user, or may be terminal devices of different users.

In an embodiment, the first terminal device and the third terminal device are already registered with the server, and the first terminal device has an association relationship with the third terminal device or the first terminal device has no association relationship with the third terminal device.

In an embodiment, the first terminal device and the third terminal device are already registered with the server, and the first terminal device has an association relationship with the third terminal device. In this case, when the desktop data of the first terminal device changes, the server may synchronously update desktop data of the third terminal device that has the association relationship with the first terminal device. Alternatively, the first terminal device and the third terminal device are already registered with the server, and the first terminal device has no association relationship with the third terminal device. In this case, when the desktop data of the first terminal device changes, the server may synchronously update desktop data of the third terminal device by default.

For example, when the user uses a plurality of mobile phones at the same time, the user selects "automatic data synchronization" in the APP market. When the user modifies a desktop folder of a mobile phone or adds or deletes a corresponding APP, the update is automatically synchronized to other mobile phones. This enables users to easily and automatically keep usage environments of the plurality of mobile phones consistent. The APP market provides an interface for the user to bind or register a plurality of mobile phones that are used at the same time. After the user agrees to automatically synchronize data, if the user modifies a desktop folder name of a mobile phone or adds or deletes a corresponding APP, the server automatically updates and stores the modified data at the server end. With consent of the user, the server automatically synchronizes the desktop folder and corresponding APP information that are stored at the server end to other mobile phones of the user.

It should be understood that the first terminal device has an association relationship or a binding relationship with the third terminal device. The association relationship or the binding relationship may be that user information of the first terminal device is consistent with that of the third terminal device, or login accounts of the first terminal device and the third terminal device are connected, or the like.

In the foregoing embodiment of this application, an application program APP may be managed by using an APP market (including a client and a server end). Because the APP market is requisite software of a terminal device, a user can automatically complete clustering of an existing APP and automatically place the APP into a correct desktop folder without installing other software. In addition, each time an APP is downloaded, the APP is automatically clustered, without a manual user operation. In addition, the APP market has data such as multi-level categories and tags of APPs, top query terms, and synonyms. This helps analyze and determine APPs of a same category or similar categories for automatic clustering. For example, APPs of travel and scenic spot accommodation reservation can be clustered. Various types of data in the APP market can be used to effectively analyze a purpose of interest of using a multi-purpose APP by the user, to find a more appropriate folder for clustering.

In addition, an APP installed by the user and a corresponding folder are managed on the server end by using the APP market. The user may manage the installed APP by category in the APP market APP, or modify a folder name. The user may conveniently view APPs on the mobile phone, and the APP market may further recommend similar APPs to the user. In a method in a conventional technology, when a user switches to another mobile phone, usually, APPs need to be installed one by one, and a desktop folder of an original mobile phone cannot be replicated. In this application, an APP installed on an original mobile phone of a user and a corresponding desktop folder are stored at a server end of an APP market, so that the user can quickly replicate the desktop folder and the corresponding APP to a new mobile phone. This facilitates use by the user. If the user uses a plurality of mobile phones at the same time, changes of a desktop folder and a corresponding APP of each mobile phone can be synchronized to other mobile phones.

Figure 4:
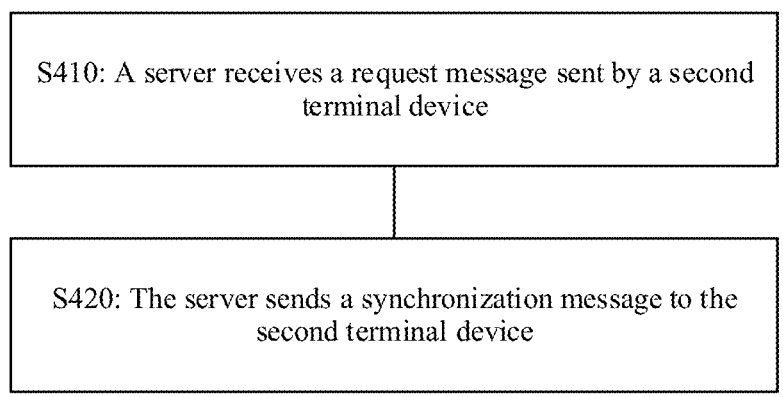
FIG. 4 is a schematic flowchart of a method for replicating data between different terminal devices according to an embodiment.

A method for replicating data between different terminal devices provided in this application is described in detail below with reference to FIG. 4. FIG. 4 is a schematic flowchart of a method 400 for replicating data between different terminal devices according to an embodiment of this application. The method 400 may be applied to the scenario shown in FIG. 1, or certainly may be applied to another scenario. This is not limited in this embodiment of this application.

It should be further understood that, in this embodiment of this application, the method is described by using an example in which the method is performed by a server. By way of example but not limitation, the method may alternatively be performed by a chip, a chip system, a processor, or the like used in the server.

As shown in FIG. 4, the method 400 shown in FIG. 4 may include S410 and S420. The following describes in detail each operation in the method 400 with reference to FIG. 4.

S410: A server receives a request message sent by a second terminal device, where the request message is used to request to replicate desktop data of a first terminal device, and the server stores the desktop data of the first terminal device.

S420: The server sends a synchronization message to the second terminal device, where the synchronization message is used to replicate the desktop data of the first terminal device to a desktop of the second terminal device.

In the method, the server stores desktop data of different terminal devices, so that the desktop data of the different terminal devices can be replicated.

It should be understood that the server may be a server end of an APP market, or may not be a server end of an APP market. The server stores desktop information of a plurality of terminal devices.

In an embodiment, before the server sends the synchronization message to the second terminal device, the server may first obtain permission of the first terminal device, that is, the server may send the synchronization message to the second terminal device only with the permission of the first terminal device.

In an embodiment, the method 400 further includes: managing a desktop folder of the first terminal device and/or an APP included in the desktop folder; and sending a first update message to the first terminal device, where the update message includes an operation of managing the desktop folder of the first terminal device and/or the APP included in the desktop folder.

In an embodiment, the server synchronously establishes a relationship between an APP downloaded by the first terminal device and a corresponding desktop folder. The user may manage an installed APP and a corresponding folder at the server end (an operation such as adding, deleting, or changing a desktop folder name may be performed). After the user modifies information about the folder and the downloaded APP at the server end, the server sends the first update message to the first terminal device, so that the first terminal device updates the desktop folder and the downloaded APP on the first terminal device in a timely manner, keeping consistency between desktop data at the server end and that on the first terminal device.

In an embodiment, the method 400 further includes: receiving a second update message sent by the first terminal device, where the second update message includes an operation of managing, by the first terminal device, the desktop folder of the first terminal device and/or the APP included in the desktop folder; and managing, according to the second update message, the desktop folder of the first terminal device and/or the APP included in the desktop folder.

In an embodiment, the server synchronously establishes a relationship between an APP downloaded by the first terminal device and a corresponding desktop folder. The user may manage an installed APP and a corresponding folder on the first terminal device (an operation such as adding, deleting, or changing a desktop folder name may be performed). After the user modifies information about the folder and the downloaded APP on the first terminal device, the first terminal device sends the second update message to the server, so that the server updates, in a timely manner, the desktop folder and the downloaded APP that are created on the server, keeping consistency between desktop data at the server end and that on the first terminal device.

In an embodiment, the method 400 further includes: The server sends an update message to the third terminal device when the desktop data of the first terminal device is updated. The update message is used to update changed desktop data of the first terminal device to the third terminal device. The first terminal device and the third terminal device are binded.

In an embodiment, that the desktop data of the first terminal device is updated may be that the user actively modifies the desktop data of the first terminal device through the server, or the user modifies the desktop data of the first terminal device on the first terminal device and synchronizes a modification operation to the server end. When the desktop data of the first terminal device is updated, the server sends the update message to the third terminal device, so that the third terminal device updates the updated desktop data of the first terminal device to the third terminal device according to the update message. It should be understood that the third terminal device and the first terminal device may be different terminal devices of a same user, or may be terminal devices of different users. If the third terminal device and the first terminal device are terminal devices of different users, the first terminal device and the third terminal device are binded in advance.

Figure 5:
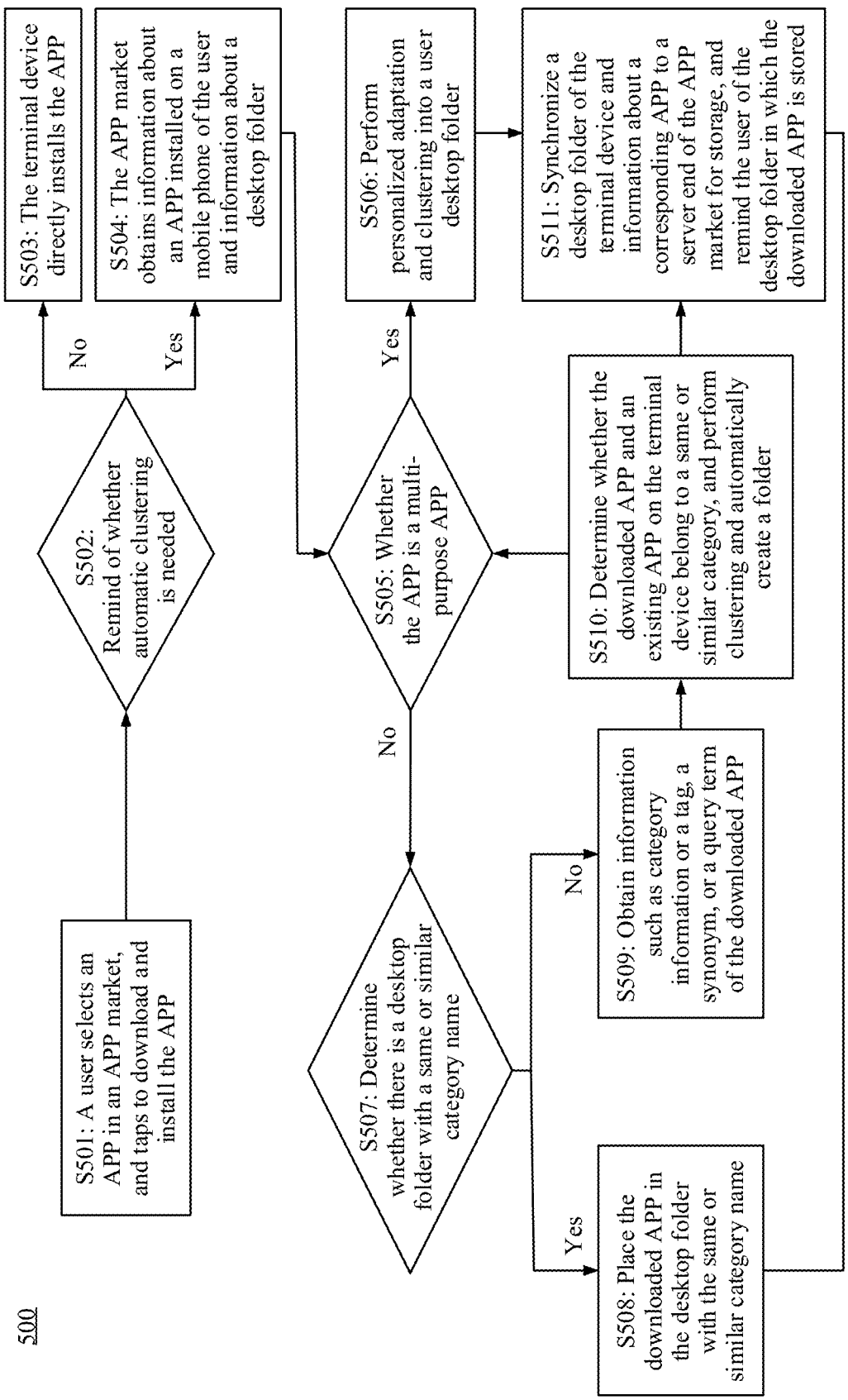
FIG. 5 is a schematic flowchart of an APP management method according to an embodiment.

When an APP is managed by using an APP market installed on a terminal device, in most cases, operations on a client and a server of the APP market are not obviously divided, and may be understood as the APP market. The following describes in detail by using FIG. 5. FIG. 5 is a schematic flowchart of an APP management method according to this application. As shown in FIG. 5, the method 500 shown in FIG. 5 may include S501 and S518. The following describes in detail each operation in the method 500 with reference to FIG. 5.

S501: A user selects an APP in an APP market APP of a terminal device, and taps to download and install the APP.

S502: The APP market of the terminal device reminds the user of whether automatic clustering into a desktop folder is needed.

S503: If the user selects "no", the terminal device directly installs the APP.

S504: If the user selects "yes", or the user selects "no reminder, automatic clustering", the APP market obtains information about an APP installed on the terminal device and information about a desktop folder.

S505: The APP market determines whether the downloaded APP is a multi-purpose APP.

S506: If the downloaded APP is a multi-purpose APP, the APP market identifies a user preference based on user behavior data, and performs personalized adaptation and clustering into a user desktop folder.

In an embodiment, the APP market needs to determine type information of the downloaded APP based on historical download data and/or search data of the user, and then cluster the downloaded APP based on the type information of the downloaded APP. For details, refer to related operations in the method 200 in the foregoing embodiment. To avoid repetition, details are not described herein again.

S507: If the downloaded APP is not a multi-purpose APP, the APP market determines whether there is a desktop folder with a same or similar category name, and determines a target desktop folder in which the downloaded APP is to be clustered.

In an embodiment, the APP market may determine, according to the type information of the downloaded APP and attribute information of a desktop folder on the terminal device, the target desktop folder in which the downloaded APP is to be clustered. The attribute information of the desktop folder includes a name of the desktop folder or type information of an APP in the desktop folder, and a name of the target desktop folder may be the same as or similar to category information of the downloaded APP.

The terminal device automatically discovers, in the APP market APP, a name of a desktop folder and the type information of the downloaded APP; determines a similarity between the type information of the downloaded APP and a name of a first desktop folder; determines whether the names are the same or similar according to the similarity; and places the downloaded APP in the first desktop folder when the similarity is greater than or equal to a first threshold or the similarity is the highest.

The terminal device automatically discovers, in the APP market APP, type information of an APP in a desktop folder and the type information of the downloaded APP; determines a similarity between the type information of the downloaded APP and the type information of the first APP in the desktop folder; determines whether the names are the same or similar according to the similarity; and places the downloaded APP in the second desktop folder in which the first APP is located when the similarity is greater than or equal to a second threshold or the similarity is the highest.

For details of determining the target desktop folder in which the downloaded APP is to be clustered, refer to related operations in the method 200 in the foregoing embodiment. To avoid repetition, details are not described herein again.

S508: If there is a desktop folder with a same or similar category name, place the downloaded APP in the desktop folder with the same or similar category name.

S509: If there is no desktop folder with a same or similar category name, the APP market obtains information such as category information or a tag, a synonym, or a query term of the downloaded APP.

S510: The APP market determines whether the downloaded APP and an existing APP on the terminal device belong to a same or similar category, and if the downloaded APP and the existing APP on the terminal device belong to a same or similar category, clusters the downloaded APP and the existing APP on the terminal device that belongs to the same or similar category, and automatically creates a folder, where a name of the folder may be a category name of the downloaded APP.

It should be understood that, if the terminal device fails to obtain, in the APP market, the target desktop folder in which the downloaded APP is to be clustered, the terminal device automatically creates a desktop folder, may name the created desktop folder according to the category information of the APP, and then place the downloaded APP into the created desktop folder.

S511: Synchronize a desktop folder of the terminal device and information about a corresponding APP to a server end of the APP market for storage, and remind the user of the desktop folder in which the downloaded APP is stored.

The APP market may remind the user of whether data about a relationship between a desktop folder of a mobile phone of the user and a corresponding APP needs to be stored at the server end, to facilitate the user to manage and replicate a desktop folder and a corresponding APP. If the user selects "unwanted", the operation is canceled. If the user chooses "agree" or "no reminder for automatic data synchronization", the APP market synchronizes data about a relationship between all desktop folders of the mobile phone and corresponding APPs to the server end of the APP market for storage.

Figure 6:
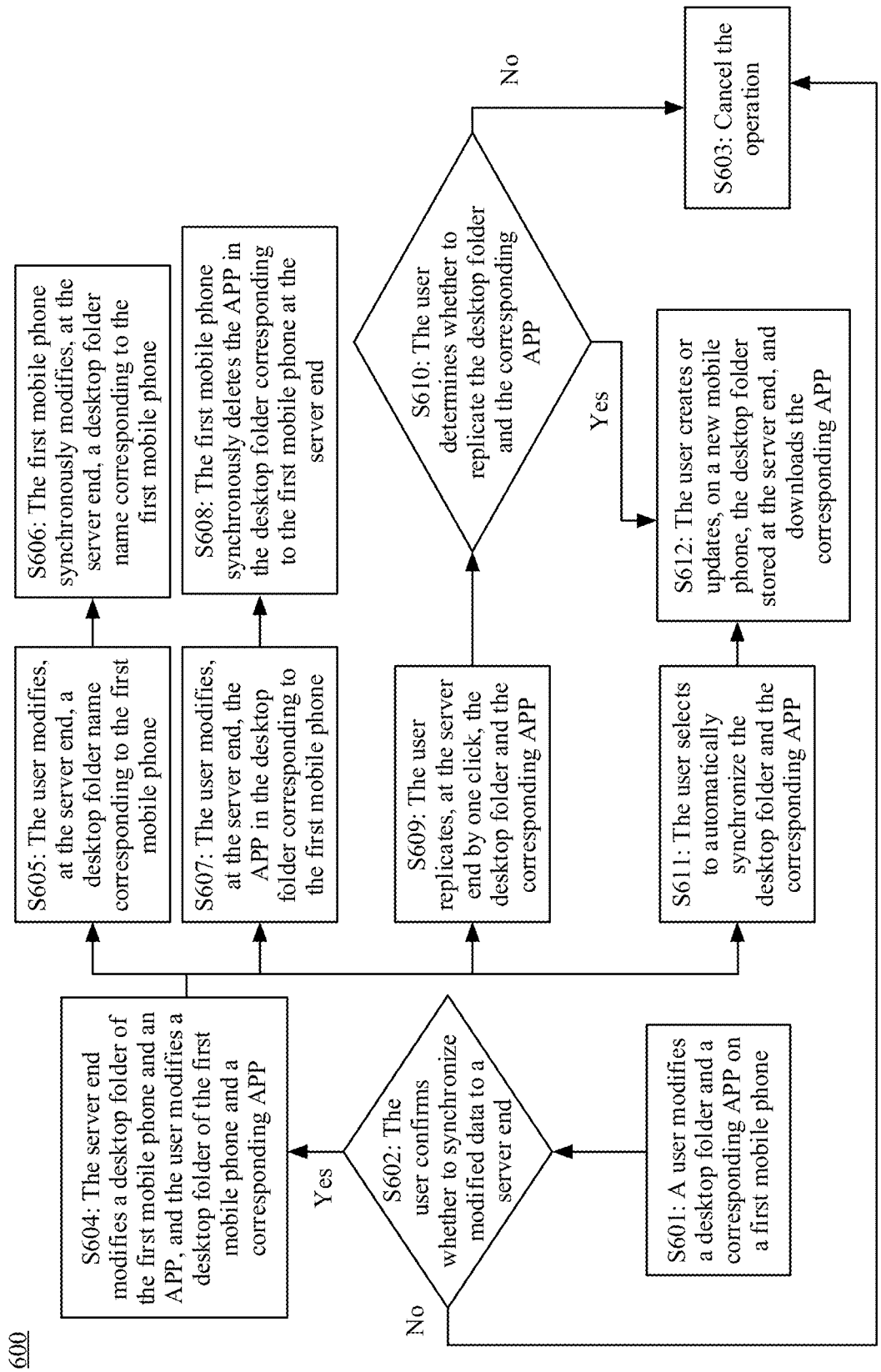
FIG. 6 is a schematic flowchart of a method in which a server end manages and replicates a desktop folder and a corresponding APP of a terminal device according to an embodiment.

FIG. 6 is a schematic flowchart of a method in which a server end manages and replicates a desktop folder and a corresponding APP of a terminal device according to an embodiment. The terminal device in FIG. 6 is, for example, a mobile phone. As shown in FIG. 6, the method 600 shown in FIG. 6 may include S601 and S612. The following describes the operations in the method 600 in detail with reference to FIG. 6.

S601: A user modifies, on a first mobile phone, a desktop folder and a corresponding APP on the first mobile phone.

Modifying a desktop folder and a corresponding APP on the first mobile phone may include but is not limited to the following operations: deleting a desktop folder, deleting an APP included in a desktop folder, manually modifying a name of a desktop folder, and the like.

S602: The user confirms whether to synchronize modified data of the first mobile phone to a server end.

It should be understood that the server may be a server end of an APP market, or may not be a server end of an APP market.

S603: If the user confirms that the modified data is not synchronized to the server end, the user cancels the operation.

S604: If the user confirms that the modified data is synchronized to the server end, the server end modifies, according to the synchronization operation, a desktop folder of the first mobile phone and a corresponding APP that are stored in the server.

S605: The user modifies, in the server, a desktop folder name of the first mobile phone.

S606: The server end indicates the first mobile phone to synchronously modify a desktop folder name of the first mobile phone.

S607: The user modifies, in the server, the APP in the desktop folder of the first mobile phone.

S608: The server end indicates the first mobile phone to synchronously modify the APP in the desktop folder of the first mobile phone.

S609: The user replicates, at the server end by one click, the desktop folder and the corresponding APP.

S610: The user determines, on a client, whether to replicate the desktop folder and the corresponding APP.

S611: The user selects to automatically synchronize the desktop folder and the corresponding APP.

S612: If the user determines, on the client, to replicate the desktop folder and the corresponding APP or the user chooses to automatically synchronize the desktop folder and the corresponding APP, the desktop folder stored at the server end is created or updated on a new mobile phone of the user, the corresponding APP is downloaded, and the APP is placed in the corresponding desktop folder.

If the user determines, on the client, not to replicate the desktop folder and the corresponding APP, go to S603 of operation cancellation.

The foregoing describes in detail the application program management method in embodiments of this application with reference to FIG. 1 to FIG. 6. The following describes in detail the communication apparatuses in embodiments of this application with reference to FIG. 7 to FIG. 8.

Figure 7:
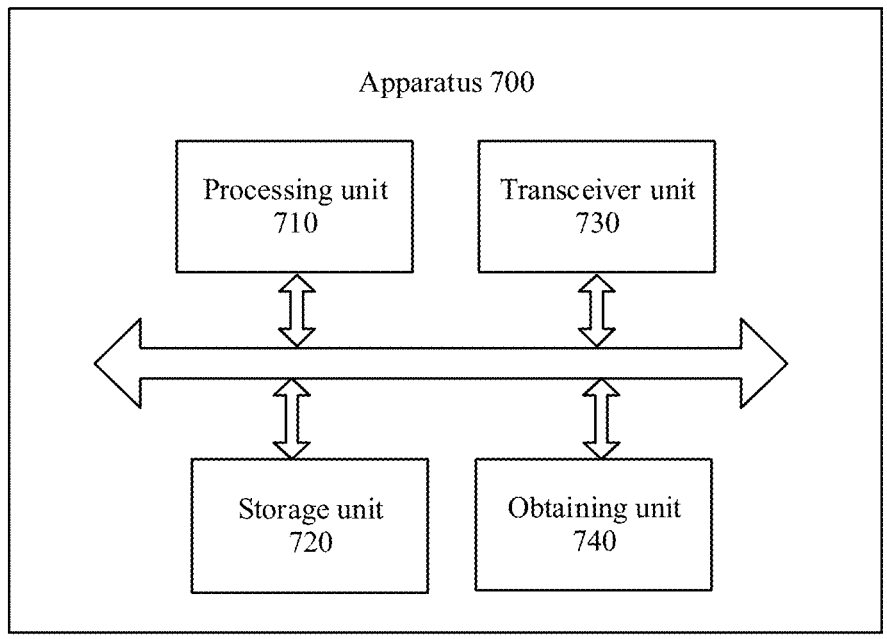
FIG. 7 is a schematic block diagram of a communication apparatus according to an embodiment.

FIG. 7 is a schematic block diagram of a communication apparatus 700 according to an embodiment of this application.

In some embodiments, the apparatus 700 may be a terminal device, or may be a chip or a circuit, for example, a chip or a circuit that may be disposed in the terminal device.

In an embodiment, the apparatus 700 may include a processing unit 710 (that is, an example of a processor) and a transceiver unit 730. In some embodiments, the processing unit 710 may also be referred to as a determining unit. In some embodiments, the transceiver unit 730 may include a receiving unit and a sending unit.

In an embodiment, the transceiver unit 730 may be implemented by using a transceiver, a transceiver-related circuit, or an interface circuit.

In an embodiment, the apparatus may further include a storage unit 720. In an embodiment, the storage unit 720 is configured to store instructions. In an embodiment, the storage unit may be further configured to store data or information. The storage unit 720 may be implemented by using a memory.

In some embodiments, the processing unit 710 is configured to execute the instructions stored in the storage unit 720, so that the apparatus 700 implements the operations performed by the terminal device in the foregoing methods. Alternatively, the processing unit 710 may be configured to invoke the data in the storage unit 720, so that the apparatus 700 implements the operations performed by the terminal device in the foregoing methods.

In some embodiments, the processing unit 710 is configured to execute the instructions stored in the storage unit 720, so that the apparatus 700 implements the operations performed by the access network device in the foregoing methods. Alternatively, the processing unit 710 may be configured to invoke the data in the storage unit 720, so that the apparatus 700 implements the operations performed by the access network device in the foregoing methods.

For example, the processing unit 710, the storage unit 720, and the transceiver unit 730 may communicate with each other by using an internal connection path to transfer a control signal and/or a data signal. For example, the storage unit 720 is configured to store a computer program, and the processing unit 710 may be configured to invoke the computer program from the storage unit 720 and run the computer program, to control the transceiver unit 730 to receive a signal and/or send a signal, to complete the operations of the terminal device or the access network device in the foregoing methods. The storage unit 720 may be integrated into the processing unit 710, or may be disposed separately from the processing unit 710.

In an embodiment, if the apparatus 700 is a communication device (for example, a terminal device or an access network device), the transceiver unit 730 includes a receiver and a transmitter. The receiver and the transmitter may be a same physical entity or different physical entities. When the receiver and the transmitter are a same physical entity, the receiver and the transmitter may be collectively referred to as a transceiver.

When the apparatus 700 is a terminal device, the transceiver unit 730 may be a sending unit or a transmitter when sending information, and the transceiver unit 730 may be a receiving unit or a receiver when receiving information. The transceiver unit may be a transceiver. The transceiver, the transmitter, or the receiver may be a radio frequency circuit. When the apparatus includes the storage unit, the storage unit is configured to store computer instructions. The processor is communicatively connected to the memory. The processor executes the computer instructions stored in the memory, so that the apparatus can perform the method 200, the method 700, or the method 600. The processor may be a general-purpose central processing unit (CPU), a microprocessor, or an application-specific integrated circuit (ASIC).

In an embodiment, if the apparatus 700 is a chip or a circuit, the transceiver unit 730 includes an input interface and an output interface.

When the apparatus 700 is a chip, the transceiver unit 730 may be an input and/or output interface, a pin, a circuit, or the like. The processing unit 710 may execute computer-executable instructions stored in the storage unit, so that the apparatus can perform the method 200, the method 300, or the method 400. In an embodiment, the storage unit is a storage unit in the chip, for example, a register or a cache, or the storage unit may be a storage unit in the terminal but outside the chip, for example, a read-only memory (ROM), another type of static storage device capable of storing static information and instructions, or a random access memory (RAM).

In an embodiment, it may be considered that a function of the transceiver unit 730 is implemented by using a transceiver circuit or a dedicated transceiver chip. It may be considered that the processing unit 710 is implemented by using a dedicated processing chip, a processing circuit, a processing unit, or a general-purpose chip.

In another embodiment, it may be considered that the communication device (for example, the terminal device or the access network device) provided in embodiments of this application is implemented by using a general-purpose computer. That is, program code for implementing functions of the processing unit 710 and the transceiver unit 730 is stored in the storage unit 720, and a general-purpose processing unit implements the functions of the processing unit 710 and the transceiver unit 730 by executing the code in the storage unit 720.

In some embodiments, the apparatus 700 may be a terminal device, or a chip or a circuit that is disposed in the terminal. When the apparatus 700 is a terminal device, or a chip or a circuit disposed in the terminal device, the obtaining unit 740 is configured to obtain, in the APP market APP according to type information of an APP downloaded by the terminal device and attribute information of a desktop folder on the terminal device, a target desktop folder in which the downloaded APP is to be clustered; and the processing unit 710 is configured to cluster the downloaded APP into the target desktop folder.

In an embodiment, the attribute information of the desktop folder includes a name of the desktop folder or type information of an APP in the desktop folder.

In an embodiment, the obtaining unit 740 is configured to: determine a similarity between the type information of the downloaded APP and a name of a first desktop folder according to a similarity algorithm, where the first desktop folder is any desktop folder on the terminal device; and determine the first desktop folder as the target desktop folder when the similarity is greater than or equal to a first threshold or the similarity is the highest.

In an embodiment, the obtaining unit 740 is configured to: determine a similarity between the type information of the downloaded APP and type information of a first APP according to a similarity algorithm, where the first APP is an APP in the desktop folder and a desktop folder in which the first APP is located is a second desktop folder; and determine the second desktop folder as the target desktop folder when the similarity is greater than or equal to a second threshold or the similarity is the highest.

In an embodiment, the obtaining unit 740 is further configured to: obtain, in the APP market APP, type information of a second APP on the terminal device according to a preset rule; determine a similarity between the type information of the downloaded APP and the type information of the second APP of a plurality of APPs on the terminal device according to the similarity algorithm, where the second APP is an APP on the terminal device, and the second APP is not clustered into a desktop folder on the terminal device; generate a third desktop folder when the similarity is greater than or equal to the second threshold or the similarity is the highest; name the third desktop folder according to the type information of the currently downloaded APP and/or the type information of the second APP; and cluster the currently downloaded APP and the second APP into the third desktop folder.

In an embodiment, the processing unit 710 is further configured to: determine, in the APP market APP, the type information of the downloaded APP according to historical download data and/or search data of a user.

In an embodiment, the obtaining unit 740 is configured to obtain the type information of the second APP from download information of the second APP. The transceiver unit 730 is configured to send a query message to a server, where the query message indicates the server to search for the type information of the second APP; and the transceiver unit 730 is further configured to receive a feedback message sent by the server, where the feedback message includes the type information of the second APP. The obtaining unit 740 is further configured to obtain the type information of the second APP according to the feedback message.

In an embodiment, the obtaining unit 730 is further configured to: predict the type information of the second APP according to a machine learning model when the received feedback message sent by the server indicates that the type information of the second APP is not found.

In an embodiment, the processing unit 710 is further configured to: generate a fourth desktop folder when the target desktop folder in which the downloaded APP is to be clustered is not obtained; name the fourth desktop folder according to a type of the downloaded APP; and add the downloaded APP to the fourth desktop folder.

In an embodiment, the processing unit 710 is further configured to: remind the user of the target desktop folder in which the downloaded APP is located.

In an embodiment, the transceiver unit 730 is further configured to send an update message to the server. The update message includes an operation of managing a desktop folder of the terminal device and/or an APP included in the desktop folder. The update message indicates the server to update, based on the operation of the terminal device of managing the desktop folder of the terminal device and/or the APP included in the desktop folder, desktop data of the terminal device that is stored at the server end.

When the apparatus 700 is configured in a terminal device or is a terminal device, modules or units in the apparatus 700 may be configured to perform actions or processing processes performed by the terminal device in the foregoing method. To avoid repetition, detailed description thereof is omitted herein.

In some embodiments, the apparatus 700 may be a server, or a chip or a circuit disposed in the server. When the apparatus 700 is a server, or a chip or a circuit disposed in the server, the transceiver unit 730 is configured to receive a request message sent by a first terminal device. The request message is used to request the server to obtain a target desktop folder in which an APP downloaded by the first terminal device is to be clustered, and a client APP of the APP market is installed on the first terminal device. The processing unit 710 is configured to obtain, according to type information of the APP downloaded by the first terminal device and attribute information of a desktop folder on the first terminal device, the target desktop folder in which the downloaded APP is to be clustered. The transceiver unit 730 is further configured to send a feedback message to the first terminal device, where the feedback message includes a name of the target desktop folder.

In an embodiment, the attribute information of the desktop folder includes a name of the desktop folder or type information of an APP in the desktop folder.

In an embodiment, the processing unit 710 is configured to: determine a similarity between the type information of the downloaded APP and a name of a first desktop folder according to a similarity algorithm, where the first desktop folder is any desktop folder on the first terminal device; and determine the first desktop folder as the target desktop folder when the similarity is greater than or equal to a first threshold or the similarity is the highest.

In an embodiment, the processing unit 710 is configured to: determine a similarity between the type information of the downloaded APP and type information of a first APP according to a similarity algorithm, where the first APP is any APP in the desktop folder and a desktop folder in which the first APP is located is a second desktop folder; and determine the second desktop folder as the target desktop folder when the similarity is greater than or equal to a second threshold or the similarity is the highest.

In an embodiment, the processing unit 719 is further configured to: obtain type information of a second APP on the first terminal device; determine a similarity between the type information of the downloaded APP and the type information of the second APP of a plurality of APPs on the first terminal device according to the similarity algorithm, where the second APP is an APP on the first terminal device, and the second APP is not clustered into a desktop folder on the first terminal device; generate a third desktop folder when the similarity is greater than or equal to the second threshold or the similarity is the highest; name the third desktop folder according to the type information of the currently downloaded APP and/or the type information of the second APP; and cluster the currently downloaded APP and the second APP into the third desktop folder.

In an embodiment, when the downloaded APP is a multi-purpose APP, the processing unit is further configured to: determine the type information of the downloaded APP according to historical download data and/or search data of a user.

In an embodiment, the processing unit 710 is further configured to: obtain the type information of the second APP from download information of the second APP; and predict the type information of the second APP according to a machine learning model when the type information of the second APP does not exist in the download information of the second APP.

In an embodiment, the processing unit 710 is further configured to: generate a fourth desktop folder when the target desktop folder in which the downloaded APP is to be clustered is not obtained; and name the fourth desktop folder according to a type of the downloaded APP. The transceiver unit 730 is configured to send the feedback message to the first terminal device, where the feedback message includes a name of the fourth desktop folder.

In an embodiment, the transceiver unit 730 is further configured to: send a reminder message to the first terminal device, where the reminder message is used to remind a user of the target desktop folder in which the downloaded APP is located.

In an embodiment, the transceiver unit 730 is further configured to: obtain the type information of the APP downloaded by the first terminal device and the attribute information of the desktop folder on the first terminal device.

In an embodiment, the processing unit 710 is configured to: manage a desktop folder of the first terminal device and/or an APP included in the desktop folder. The transceiver unit is further configured to send an update message to the first terminal device. The update message includes an instruction for managing the desktop folder of the first terminal device and/or the APP included in the desktop folder, and the update message indicates the first terminal device to update the desktop folder of the first terminal device and/or the APP included in the desktop folder.

In an embodiment, the transceiver unit 730 is further configured to: receive a request message sent by a second terminal device, where the request message is used to request to replicate desktop data of the first terminal device, and the desktop data includes a desktop folder of the first terminal device, an APP included in the desktop folder of the first terminal device, and an APP not included in the desktop folder of the first terminal device; and send the desktop data of the first terminal device to the second terminal device.

In an embodiment, the transceiver unit 730 is further configured to: send an update message to the third terminal device when the desktop data of the first terminal device changes. The update message is used to update changed desktop data of the first terminal device to the third terminal device, and the first terminal device and the third terminal device are already registered with the server.

In some embodiments, the apparatus 700 may be a server, or a chip or a circuit disposed in the server. When the apparatus 700 is a server, or a chip or a circuit disposed in the server, the transceiver unit 730 is configured to receive a request message sent by a second terminal device, where the request message is used to request to replicate desktop data of a first terminal device, the server stores the desktop data of the first terminal device, and the desktop data includes a desktop folder of the first terminal device, an APP included in the desktop folder of the first terminal device, and an APP not included in the desktop folder of the first terminal device; and the transceiver unit 730 is configured to send the desktop data of the first terminal device to the second terminal device.

In an embodiment, the server further includes a processing unit. The processing unit 710 is configured to: manage a desktop folder of the first terminal device and/or an APP included in the desktop folder. The transceiver unit 730 is further configured to send a first update message to the first terminal device, where the first update message indicates the first terminal device to update the desktop folder of the first terminal device and/or the APP included in the desktop folder.

In an embodiment, the transceiver unit 730 is configured to receive a second update message sent by the first terminal device. The second update message includes an instruction for managing, by the first terminal device, the desktop folder of the first terminal device and/or the APP included in the desktop folder, and the second update message indicates the server to update the desktop folder of the first terminal device and/or the APP included in the desktop folder that are/is stored at the server end. The processing unit 710 is further configured to manage, according to the second update message, the desktop folder of the first terminal device and/or the APP included in the desktop folder.

In an embodiment, the transceiver unit 730 is configured to: send an update message to the third terminal device when the desktop data of the first terminal device changes. The update message is used to update changed desktop data of the first terminal device to the third terminal device, and the first terminal device and the third terminal device are already registered with the server.

Figure 8:
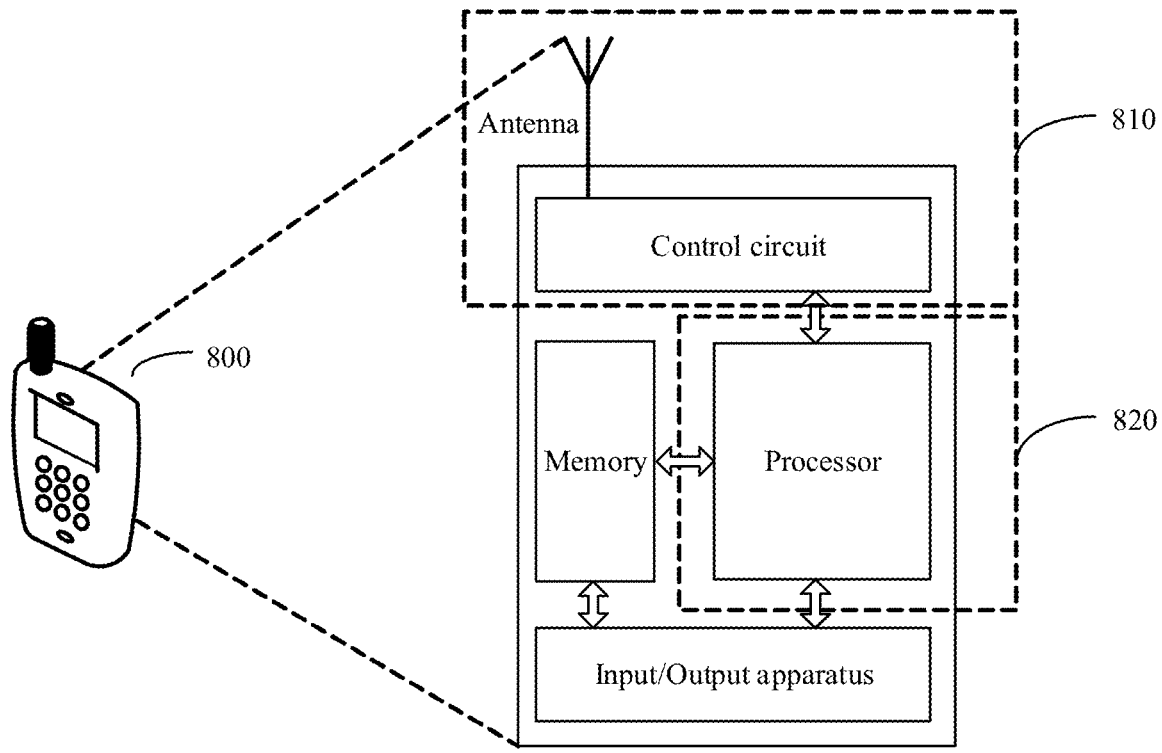
FIG. 8 is a schematic diagram depicting a structure of a terminal device according to an embodiment.

FIG. 8 is a schematic diagram depicting a structure of a terminal device 800 according to this application. The terminal device 800 may perform the actions performed by the terminal device in the foregoing method embodiments.

For ease of description, FIG. 8 shows only main components of the terminal device. As shown in FIG. 8, the terminal device 800 includes a processor, a memory, a control circuit, an antenna, and an input/output apparatus.

The processor is mainly configured to: process a communication protocol and communication data, control the entire terminal device, execute a software program, and process data of the software program. For example, the processor is configured to support the terminal device in performing the actions described in the embodiments of the transmission precoding matrix indication method. The processor may implement functions of the processing unit and the obtaining unit. The memory is mainly configured to store the software program and the data, for example, store a codebook described in the foregoing embodiment. The control circuit is mainly configured to convert a baseband signal and a radio frequency signal and process the radio frequency signal. The control circuit and the antenna together may also be referred to as a transceiver, and are mainly configured to receive and send a radio frequency signal in a form of an electromagnetic wave. The input/output apparatus, such as a touchscreen, a display, or a keyboard, is mainly configured to receive data input by a user and output data to the user.

After the terminal device is powered on, the processor may read the software program in the storage unit, interpret and execute instructions of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends a radio frequency signal in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 8 shows only one memory and one processor. In an actual terminal device, there may be a plurality of processors and memories. The memory may also be referred to as a storage medium, a storage device, or the like. This is not limited in embodiments of this application.

For example, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 8 integrates functions of the baseband processor and the central processing unit. A person skilled in the art may understand that the baseband processor and the central processing unit may alternatively be independent processors, and are interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected by using various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in a storage unit in a form of a software program. The processor executes the software program, to implement a baseband processing function.

For example, in this embodiment of this application, the antenna and the control circuit that have receiving and sending functions may be considered as a transceiver unit 810 of the terminal device 800, and the processor having a processing function may be considered as a processing unit 820 of the terminal device 800. As shown in FIG. 8, the terminal device 800 includes the transceiver unit 810 and the processing unit 820. The transceiver unit may also be referred to as a transceiver machine, a transceiver, a transceiver apparatus, or the like. In an embodiment, a component that is in the transceiver unit 810 and that is configured to implement a receiving function may be considered as a receiving unit, and a component that is in the transceiver unit 810 and that is configured to implement a sending function may be considered as a sending unit. That is, the transceiver unit includes a receiving unit and a sending unit. For example, the receiving unit may also be referred to as a receiver, a receive machine, or a receiving circuit, and the sending unit may also be referred to as a transmitter, a transmit machine, or a transmitting circuit.

It should be understood that, the processor in embodiments of this application may be a central processing unit (CPU), another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, any conventional processor, or the like.

It may be understood that the memory in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, random access memories (RAM) in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or a part of the foregoing embodiments may be implemented using software, hardware, firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

An embodiment of this application further provides a computer-readable medium, and the computer-readable medium stores a computer program. When the computer program is executed by a computer, the operations performed by the terminal device in any one of the foregoing embodiments is implemented.

An embodiment of this application further provides a computer-readable medium that stores a computer program. When the computer program is executed by a computer, the operations performed by the server in any one of the foregoing embodiments are implemented.

An embodiment of this application further provides a computer program product. When the computer program product is executed by a computer, the operations performed by the terminal device in any one of the foregoing embodiments is implemented.

An embodiment of this application further provides a computer program product. When the computer program product is executed by a computer, the operations performed by the server in any one of the foregoing embodiments are implemented.

An embodiment of this application further provides a system chip. The system chip includes a communication unit and a processing unit. The processing unit may be, for example, a processor. The communication unit may be, for example, a communication interface, an input/output interface, a pin, a circuit, or the like. The processing unit may execute computer instructions, so that the chip in the communication apparatus performs the operations performed by the terminal device provided in the foregoing embodiments of this application.

In an embodiment, the computer instructions are stored in a storage unit.

An embodiment of this application further provides a system chip. The system chip includes a communication unit and a processing unit. The processing unit may be, for example, a processor. The communication unit may be, for example, a communication interface, an input/output interface, a pin, a circuit, or the like. The processing unit may execute computer instructions, so that the chip in the communication apparatus performs the operations performed by the server in the foregoing embodiments of this application.

In an embodiment, the computer instructions are stored in a storage unit.

An embodiment of this application further provides a system. The system includes the terminal device provided in the foregoing embodiments of this application and the server provided in the foregoing embodiments of this application.

Embodiments in this application may be used independently, or may be used jointly. This is not limited herein.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel, and various other media that can store, contain and/or carry an instruction and/or data.

It should be understood that the term "and/or" describes an association relationship between associated objects, and represents that three relationships may exist. For example, A and/or B may represent the following three cases: Only A exists, both A and B exist, and only B exists. The character "/" usually indicates an "or" relationship between the associated objects. "At least one" means one or more. Similar to "A and/or B", "at least one of A and B", describes an association relationship between the associated objects and represents that three relationships may exist. For example, at least one of A and B may represent the following three cases: Only A exists, both A and B exist, and only B exists.

In the specification, embodiments, claims, and accompanying drawings of this application, terms "first", "second", and the like are merely intended for distinguishing and description, and shall not be understood as an indication or implication of relative importance or an indication or implication of an order. In addition, terms "include", "have", and any variant thereof are intended to cover non-exclusive inclusion, for example, include a series of operations or units. Methods, systems, products, or devices are not necessarily limited to those operations or units that are literally listed, but may include other operations or units that are not literally listed or that are inherent to such processes, methods, products, or devices. "On", "below", and the like are used only relative to the orientation of the components in the accompanying drawings. These directional terms are relative concepts, are used for relative descriptions and clarifications, and may change accordingly as positions at which the components in the accompanying drawings are placed change.

A person of ordinary skill in the art may be aware that, in combination with the units and algorithm operations in the examples described in embodiments disclosed in this specification, this application can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the embodiment goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual requirements to achieve the objectives of the solutions of the embodiments.

In addition, functional units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or a part of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for application program (APP) management, comprising:
    obtaining, by a terminal device, a target desktop folder based on type information of an APP downloaded by the terminal device and attribute information of a desktop folder on the terminal device, wherein the attribute information of the desktop folder includes type information of a current APP in the desktop folder, wherein the downloaded APP is to be clustered in the target desktop folder;
    clustering, by the terminal device, the downloaded APP into the target desktop folder; and
    receiving, by the terminal device, a reminder message sent by a server, wherein the reminder message is used to remind a user of the target desktop folder in which the downloaded APP is located.

2. The method according to claim 1, wherein the attribute information of the desktop folder comprises a name of the desktop folder.

3. The method according to claim 2, wherein obtaining the target desktop folder comprises:
    determining, by the terminal device, a similarity between the type information of the downloaded APP and a name of a first desktop folder based on a similarity algorithm, wherein the first desktop folder is any desktop folder on the terminal device; and
    determining, by the terminal device, the first desktop folder as the target desktop folder when the similarity is greater than or equal to a first threshold or the similarity is a highest similarity.

4. The method according to claim 2, wherein obtaining the target desktop folder comprises:
    determining, by the terminal device, a similarity between the type information of the downloaded APP and type information of a first APP based on a similarity algorithm, wherein the first APP is an APP in a second desktop folder on the terminal device; and
    determining, by the terminal device, the second desktop folder as the target desktop folder when the similarity is greater than or equal to a second threshold or the similarity is a highest similarity.

5. The method according to claim 1, further comprising: when the target desktop folder in which the downloaded APP is to be clustered is not determined,
    obtaining, by the terminal device, type information of a second APP on the terminal device based on a preset rule;
    determining, by the terminal device, a similarity between the type information of the downloaded APP and the type information of the second APP based on a similarity algorithm, wherein the second APP is an APP on the terminal device, and the second APP is not clustered into the desktop folder on the terminal device;
    generating, by the terminal device, a third desktop folder when the similarity is greater than or equal to a second threshold or the similarity is a highest similarity;
    naming, by the terminal device, the third desktop folder based on the type information of the downloaded APP or the type information of the second APP; and
    clustering, by the terminal device, the downloaded APP and the second APP into the third desktop folder.

6. The method according to claim 1, further comprising: when the downloaded APP is a multi-purpose APP,
    determining, by the terminal device, the type information of the downloaded APP based on historical download data or search data of the user.

7. The method according to claim 5, wherein obtaining the type information of the second APP on the terminal device comprises:
    predicting, by the terminal device, the type information of the second APP based on a machine learning model when a received feedback message sent by athe server indicates that the type information of the second APP is not found.

8. The method according to claim 1, wherein the method further comprises:
    generating, by the terminal device, a fourth desktop folder when the target desktop folder in which the downloaded APP is to be clustered is not obtained;
    naming, by the terminal device, the fourth desktop folder based on the type information of the downloaded APP; and
    adding, by the terminal device, the downloaded APP to the fourth desktop folder.

9. The method according to claim 1, wherein the method further comprises:

reminding, by the terminal device, the user of the target desktop folder in which the downloaded APP is located.

10. The method according to claim 1, wherein the method further comprises:
sending, by the terminal device, an update message to the server, wherein the update message indicates the server to update the desktop folder of the terminal device or the current APP comprised in the desktop folder that is stored the server.

11. A method for application program (APP) management, comprising:
receiving, by a server, a request message sent by a first terminal device, wherein the request message is used to request the server to obtain a target desktop folder in which an APP downloaded by the first terminal device is to be clustered;
obtaining, by the server, the target desktop folder in which the downloaded APP is to be clustered based on type information of the APP downloaded by the first terminal device and attribute information of a desktop folder on the first terminal device, wherein the attribute information of the desktop folder includes type information of a current APP in the desktop folder; and
sending, by the server, a feedback message to the first terminal device, wherein the feedback message comprises a name of the target desktop folder; and
sending, by the server, a reminder message to the first terminal device, wherein the reminder message is used to remind a user of the target desktop folder in which the downloaded APP is located.

12. The method according to claim 11, wherein the attribute information of the desktop folder comprises a name of the desktop folder.

13. The method according to claim 12, wherein obtaining the target desktop folder in which the downloaded APP is to be clustered comprises:
determining, by the server, a similarity between the type information of the downloaded APP and a name of a first desktop folder based on a similarity algorithm, wherein the first desktop folder is any desktop folder on the first terminal device; and
determining, by the server, the first desktop folder as the target desktop folder when the similarity is greater than or equal to a first threshold or the similarity is a highest similarity.

14. The method according to claim 12, wherein obtaining the target desktop folder in which the downloaded APP is to be clustered comprises:
determining, by the server, a similarity between the type information of the downloaded APP and type information of a first APP based on a similarity algorithm, wherein the first APP is an APP in a second desktop folder on the first terminal device; and
determining, by the server, the second desktop folder as the target desktop folder when the similarity is greater than or equal to a second threshold or the similarity is a highest similarity.

15. The method according to claim 11, further comprising: when the downloaded APP is a multi-purpose APP,
determining, by the server, the type information of the downloaded APP based on historical download data or search data of the user.

16. The method according to claim 15, further comprising obtaining, by the server, type information of a second APP on the first terminal device based on a preset rule;
wherein obtaining the type information of the second APP on the first_terminal device comprises:

obtaining, by the server, the type information of the second APP from download information of the second APP; and
predicting, by the server, the type information of the second APP based on a machine learning model when the type information of the second APP does not exist in the download information of the second APP.

17. The method according to claim 11, wherein the method further comprises:
generating, by the server, a fourth desktop folder when the target desktop folder in which the downloaded APP is to be clustered is not obtained;
naming, by the server, the fourth desktop folder based on the type information of the downloaded APP; and
sending, by the server, the feedback message to the first terminal device, wherein the feedback message comprises a name of the fourth desktop folder.

18. The method according to claim 11, wherein the method further comprises:
receiving, by the server, the request message sent by a second terminal device, wherein the request message is used to request to replicate desktop data of the first terminal device, and the desktop data comprises the desktop folder of the first terminal device, the current APP comprised in the desktop folder of the first terminal device, and another APP not comprised in the desktop folder of the first terminal device; and
sending, by the server, desktop data information of the first terminal device to the second terminal device.

19. A terminal device, comprising:
at least one processor coupled to a memory having instructions stored therein, which when executed by the at least one processor, cause the terminal device to:
obtain a target desktop folder based on type information of an APP downloaded by the terminal device and attribute information of a desktop folder on the terminal device, wherein the attribute information of the desktop folder includes type information of a current APP in the desktop folder, wherein the downloaded APP is to be clustered in the target desktop folder; and
cluster the downloaded APP into the target desktop folder; and
receive a reminder message sent by a server, wherein the reminder message is used to remind a user of the target desktop folder in which the downloaded APP is located.

20. The terminal device according to claim 19, wherein the attribute information of the desktop folder comprises a name of the desktop folder.

21. The terminal device according to claim 20, wherein to obtain the target desktop folder, the instructions, which when executed by the at least one processor, cause the terminal device to:
determine a similarity between the type information of the downloaded APP and a name of a first desktop folder based on a similarity algorithm, wherein the first desktop folder is any desktop folder on the terminal device; and
determine the first desktop folder as the target desktop folder when the similarity is greater than or equal to a first threshold or the similarity is a highest similarity.

22. The terminal device according to claim 20, wherein to obtain the target desktop folder, the instructions, which when executed by the at least one processor, cause the terminal device to:
determine a similarity between the type information of the downloaded APP and type information of a first APP based on a similarity algorithm, wherein the first APP is an APP in a second desktop folder on the terminal device, and the first APP is located in the second desktop folder; and determine the second desktop folder as the target desktop folder when the similarity is greater than or equal to a second threshold or the similarity is a highest similarity.

23. The terminal device according to claim 19, wherein the instructions, which when executed by the at least one processor, further cause the terminal device to:

when the target desktop folder in which the downloaded APP is to be clustered is not determined, obtain type information of a second APP on the terminal device based on a preset rule;

determine a similarity between the type information of the downloaded APP and the type information of the second APP of a plurality of APPs on the terminal device based on a similarity algorithm, wherein the second APP is an APP on the terminal device, and the second APP is not clustered into a desktop folder on the terminal device;

generate a third desktop folder when the similarity is greater than or equal to a second threshold or the similarity is a highest similarity;

name the third desktop folder based on the type information of the downloaded APP or the type information of the second APP; and cluster the downloaded APP and the second APP into the third desktop folder.

24. The terminal device according to claim 23, wherein to obtain the type information of the second APP on the terminal device, the instructions, which when executed by the at least one processor, cause the terminal device to predict the type information of the second APP based on a machine learning model when a received feedback message sent by the server indicates that the type information of the second APP is not found.

25. The terminal device according to claim 19, wherein the instructions, which when executed by the at least one processor, further cause the terminal device to:

determine the type information of the downloaded APP based on historical download data or search data of the user.

26. A server, comprising:

at least one processor coupled to a memory having instructions stored therein, which when executed by the at least one processor, cause the server to:

receive a request message sent by a first terminal device, wherein the request message is used to request the server to obtain a target desktop folder in which an APP downloaded by the first terminal device is to be clustered; and obtain the target desktop folder in which the downloaded APP is to be clustered based on type information of the APP downloaded by the first terminal device and attribute information of a desktop folder on the first terminal device, wherein the attribute information of the desktop folder includes type information of a current APP in the desktop folder;

send a feedback message to the first terminal device, wherein the feedback message comprises a name of the target desktop folder; and send a reminder message to the first terminal device, wherein the reminder message is used to remind a user of the target desktop folder in which the downloaded APP is located.

27. The server according to claim 26, wherein the attribute information of the desktop folder comprises a name of the desktop folder.

28. The server according to claim 27, wherein to obtain the target desktop folder in which the downloaded APP is to be clustered, the instructions, which when executed by the at least one processor, cause the server to:

determine a similarity between the type information of the downloaded APP and a name of a first desktop folder based on a similarity algorithm, wherein the first desktop folder is any desktop folder on the first terminal device; and determine the first desktop folder as the target desktop folder when the similarity is greater than or equal to a first threshold or the similarity is a highest similarity.

29. The server according to claim 26, wherein the instructions, which when executed by the at least one processor, further cause the server to:

obtain type information of a second APP on the first terminal device;

determine a similarity between the type information of the downloaded APP and the type information of the second APP of a plurality of APPs on the first terminal device based on a similarity algorithm, wherein the second APP is an APP on the first terminal device, and the second APP is not clustered into a desktop folder on the first terminal device;

generate a third desktop folder when the similarity is greater than or equal to a second threshold or the similarity is a highest similarity;

name the third desktop folder based on the type information of the downloaded APP or the type information of the second APP; and cluster the downloaded APP and the second APP into the third desktop folder.

* * * * *

UNITED STATES PATENT AND TRADEMARK OFFICE
CERTIFICATE OF CORRECTION

Page 1 of 1

PATENT NO. : 12,099,471 B2
APPLICATION NO. : 18/145635
DATED : September 24, 2024
INVENTOR(S) : Bin Wu, Xiuqiang He and Li Qian It is certified that error appears in the above-identified patent and that said Letters Patent is hereby corrected as shown below:

In the Claims

In Claim 7, Column 38, Line 53, delete "sent by athe server" and insert --sent by the server--.

In Claim 10, Column 39, Line 9, delete "stored the server." and insert --stored at the server.--.

In Claim 16, Column 39, Line 67, delete "first_terminal" and insert --first terminal--.

In Claim 19, Column 40, Lines 40-41, delete "folder; and cluster the downloaded APP" and insert --folder; cluster the downloaded APP--.

Signed and Sealed this
Tenth Day of December, 2024

Katherine Kelly Vidal
*Director of the United States Patent and Trademark Office*